US009496952B2

(12) United States Patent
Bernard et al.

(10) Patent No.: US 9,496,952 B2
(45) Date of Patent: Nov. 15, 2016

(54) ROGUE OPTICAL NETWORK INTERFACE DEVICE DETECTION

(71) Applicant: Calix, Inc., Petaluma, CA (US)

(72) Inventors: Christopher T. Bernard, Wayzata, MN (US); Mark R. Biegert, Maple Grove, MN (US)

(73) Assignee: Calix, Inc., Petaluma, CA (US)

( * ) Notice: Subject to any disclaimer, the term of this patent is extended or adjusted under 35 U.S.C. 154(b) by 27 days.

(21) Appl. No.: 14/688,239

(22) Filed: Apr. 16, 2015

(65) Prior Publication Data
US 2015/0326311 A1 Nov. 12, 2015

Related U.S. Application Data

(60) Provisional application No. 61/990,610, filed on May 8, 2014, provisional application No. 62/004,027, filed on May 28, 2014.

(51) Int. Cl.
| | | |
|---|---|---|
| H04B 10/00 | (2013.01) | |
| H04B 10/038 | (2013.01) | |
| H04B 10/079 | (2013.01) | |
| H04L 29/06 | (2006.01) | |
| H04B 10/85 | (2013.01) | |
| H04Q 11/00 | (2006.01) | |
| H04J 3/14 | (2006.01) | |

(Continued)

(52) U.S. Cl.
CPC ........ *H04B 10/038* (2013.01); *H04B 10/0773* (2013.01); *H04B 10/07955* (2013.01); *H04B 10/272* (2013.01); *H04B 10/85* (2013.01); *H04J 3/14* (2013.01); *H04J 3/1694* (2013.01); *H04J 14/08* (2013.01); *H04L 63/1408* (2013.01); *H04Q 11/0067* (2013.01); *H04Q 2011/0083* (2013.01); *H04Q 2011/0086* (2013.01)

(58) Field of Classification Search
USPC ..................................... 398/66–73
See application file for complete search history.

(56) References Cited

U.S. PATENT DOCUMENTS

| | | | |
|---|---|---|---|
| 7,468,958 B2 | 12/2008 | Emery et al. | |
| 7,818,648 B2 * | 10/2010 | Haran | H04B 10/077 398/78 |

(Continued)

OTHER PUBLICATIONS

"Part 3: Carrier Sense Multiple Access with Collision Detection (CSMA/CD) Access Method and Physical Layer Specifications Amendment: Media Access Control Parameters, Physical Layers, and Management Parameters for Subscriber Access Networks," IEEE Standard for Information technology—IEEE Stds 802.3ah, Sep. 2004, 640 pp.

(Continued)

*Primary Examiner* — Agustin Bello
(74) *Attorney, Agent, or Firm* — Shumaker & Sieffert, P.A.

(57) ABSTRACT

Techniques are described for identifying a rogue network interface device whose laser is not under control of a controller of the network interface device. The techniques identify the rogue network interface device based on reception of a predefined data pattern in a timeslot that is not reserved for any of the network interface devices without needing to disable upstream data transmission from the network interface devices during their assigned timeslots. The techniques also relate to a network interface device determining whether the network interface device is transmitting optical signals at a wavelength different than the wavelength that the OLT to which the network interface device is associated receives.

20 Claims, 10 Drawing Sheets

(51) Int. Cl.
  *H04J 3/16*   (2006.01)
  *H04J 14/08*  (2006.01)
  *H04B 10/077* (2013.01)
  *H04B 10/272* (2013.01)

(56) References Cited

U.S. PATENT DOCUMENTS

| | | | | |
|---|---|---|---|---|
| 8,006,142 B2* | 8/2011 | Haran | ............... | H04B 10/077 714/704 |
| 8,768,163 B2* | 7/2014 | Kim | ............... | H04Q 11/0067 398/33 |
| 8,842,990 B2* | 9/2014 | Hood | ............... | H04Q 11/0067 398/63 |
| 2007/0143645 A1* | 6/2007 | Haran | ............... | H04B 10/077 714/704 |
| 2009/0296584 A1* | 12/2009 | Bernard | ............... | H04L 41/5032 370/241 |
| 2010/0074614 A1* | 3/2010 | DeLew | ............... | H04B 10/272 398/17 |
| 2011/0087925 A1* | 4/2011 | Haran | ............... | H04B 10/077 714/37 |
| 2012/0039602 A1* | 2/2012 | Hood | ............... | H04Q 11/0067 398/38 |
| 2013/0034356 A1* | 2/2013 | Luo | ............... | H04B 10/272 398/72 |
| 2013/0336655 A1* | 12/2013 | Grobe | ............... | H04J 14/0246 398/67 |
| 2014/0233940 A1* | 8/2014 | Pitzer | ............... | H04B 10/03 398/8 |
| 2014/0294385 A1* | 10/2014 | Khotimsky | ............... | H04Q 11/0067 398/58 |
| 2014/0369681 A1* | 12/2014 | Smith | ............... | H04B 10/0705 398/27 |
| 2015/0326311 A1* | 11/2015 | Bernard | ............... | H04B 10/038 398/2 |
| 2015/0326591 A1* | 11/2015 | Bernard | ............... | H04B 10/038 398/35 |
| 2015/0326958 A1* | 11/2015 | Bernard | ............... | H04B 10/038 398/38 |
| 2016/0073180 A1* | 3/2016 | Khotimsky | ............... | H04Q 11/0067 398/34 |

OTHER PUBLICATIONS

"Broadband optical access systems based on Passive Optical Networks (PON);" Series G: Transmission Systems and Media, Digital Systems and Networks Digital sections and digital line system—Optical line systems for local and access networks, ITU-T G.983.1, Jan. 2005, 124 pp.

"10-Gigabit-capable passive optical networks (XG-PON): Transmission convergence (TC) layer specification," Series G: Transmission Systems and Media, Digital Systems and Networks Digital sections and digital line system—Optical line systems for local and access networks, ITU-T G.987.3, Jan. 2014, 146 pp.

"40-Gigabit-capable passive optical networks (NG-PON2): General requirements," Series G: Transmission Systems and Media, Digital Systems and Networks Digital sections and digital line system—Optical line systems for local and access networks, ITU-T G.989.1, Mar. 2013, 26 pp.

"Gigabit-capable passive optical networks (G-PON): Transmission convergence layer specification," Series G: Transmission Systems and Media, Digital Systems and Networks Digital sections and digital line system—Optical line systems for local and access networks, ITU-T G.984.3, Jan. 2014, 170 pp.

"Rogue optical network unit (ONU) considerations," Series G: Transmission Systems and Media, Digital Systems and Networks, ITU-T, Series G, Supplement 49, Feb. 2011, 16 pp.

U.S. Appl. No. 14/688,218, filed by Bernard et al., on Apr. 16, 2015.
U.S. Appl. No. 14/688,259, filed by Bernard et al., on Apr. 16, 2015.

\* cited by examiner

ROGUE OPTICAL NETWORK INTERFACE DEVICE DETECTION

This application claims the benefit of U.S. Provisional Patent Application No. 61/990,610, filed May 8, 2014, and U.S. Provisional Patent Application No. 62/004,027, filed May 28, 2014, both of which are incorporated by reference herein.

TECHNICAL FIELD

This disclosure relates to networking, and more particularly, communication between an optical network interface device and an optical line terminal (OLT) in an optical network.

BACKGROUND

Network interface devices permit a subscriber to access a variety of information via a network. A passive optical network (PON), for example, can deliver voice, video and data among multiple network nodes, using a common optical fiber link. Passive optical splitters and combiners enable multiple network interface devices such as optical network terminals (ONTs), also referred to as optical network units (ONUs), to share the optical fiber link. Each network interface device terminates the optical fiber link for a residential or business subscriber, and is sometimes referred to as a subscriber premises node that delivers Fiber to the Premises (FTTP) services.

In some systems, a network interface device is connected with wiring to one or more subscriber devices in the subscriber premises, such as televisions, set-top boxes, telephones, computers, or network appliances, which ultimately receive the voice, video and data delivered via the PON. In this manner, the network interface device can support delivery of telephone, television and Internet services to subscriber devices in the subscriber premises.

SUMMARY

In general, this disclosure describes example techniques for detecting a rogue network interface device from a plurality of network interface devices in an optical network based on an optical signal that includes a predefined data pattern used for rogue network interface device identification, where such an optical signal is received in a timeslot not reserved for any of the network interface devices. In some examples, the techniques may detect which network interface device is the rogue network interface device without needing to disable upstream transmission from the network interface devices. Disabling upstream transmission may interrupt services for the subscriber devices of the network interface devices for extended periods of time, and the techniques described in this disclosure may be able to identify the rogue network interface device without such service interruption.

In the optical network, a device such as an optical line terminal (OLT) assigns each network interface device with a timeslot in which to transmit upstream optical signals. A rogue network interface device is a network interface device whose laser is not being properly controlled by a controller for the network interface device, causing the laser to output an optical signal in unassigned timeslots. For instance, in a rogue network interface device, even when a controller of a network interface device attempts to turn off a laser of the network interface device, the laser may still output upstream optical signals, including optical signals in upstream timeslots not assigned to the network interface device.

In the techniques described in this disclosure, controllers of respective network interface devices may be configured to cause respective laser drivers to turn off respective lasers during timeslots not assigned to the network interface devices. However, even when the controllers cause laser drivers to turn off lasers, each controller may output predefined data patterns to corresponding laser drivers. For non-rogue network interface devices, these predefined data patterns will not propagate as optical signals, because the laser is turned off during time slots not reserved for the network interface devices. For the rogue network interface device, however, the predefined data pattern will propagate as an optical signal because the laser for the rogue network interface device does not turn off during time slots not reserved for the network interface devices.

The OLT may monitor a timeslot that is not reserved for any of the network interface devices, and determine whether the predefined data pattern is received during this timeslot. Based on the received predefined data pattern, the OLT may determine which network interface device of the plurality of network interface devices is the rogue network interface device. In one example, the predefined data pattern may be a unique data pattern that uniquely identifies one of the network interfaces. In another example, the predefined data pattern may be a data pattern with a specified data transition density that the OLT measures and compares against a data transition density measured from an earlier data pattern to determine which one of the network interface devices is the rogue network interface device.

As described in more detail, the techniques described with respect to utilizing a predefined data pattern may be extended to multiple wavelength systems. Also, for some optical systems, the techniques describe ways in which a network interface device may determine that it is transmitting at an incorrect wavelength, as an example of a wavelength rogue network interface device.

In one example, the disclosure describes a method of rogue network interface device detection, the method comprising receiving a data pattern, embedded with a unique identifier, from an optical signal received during a quiet timeslot, wherein the quiet timeslot comprises a timeslot that is not allocated to any of a plurality of network interface devices for upstream transmission, and identifying a rogue network interface device from the plurality of network interface devices as one of the network interface devices having a unique identifier that is same as the unique identifier embedded in the data pattern received during the quiet timeslot.

In one example, the disclosure describes an optical line terminal (OLT) comprising a memory configured to store unique identifiers of a plurality of network interface devices, and one or more processors configured to receive a data pattern, embedded with a unique identifier, from an optical signal received during a quiet timeslot, wherein the quiet timeslot comprises a timeslot that is not allocated to any of a plurality of network interface devices for upstream transmission, and identify, using the unique identifiers stored in the memory, a rogue network interface device from the plurality of network interface devices as one of the network interface devices having a unique identifier that is same as the unique identifier embedded in the data pattern received during the quiet timeslot.

In one example, the disclosure describes an OLT comprising means for receiving a data pattern, embedded with a unique identifier, from an optical signal received during a quiet timeslot, wherein the quiet timeslot comprises a timeslot that is not allocated to any of a plurality of network interface devices for upstream transmission, and means for identifying a rogue network interface device from the plurality of network interface devices as one of the network interface devices having a unique identifier that is same as the unique identifier embedded in the data pattern received during the quiet timeslot.

In one example, the disclosure describes a computer-readable storage medium having instructions stored thereon that when execute cause one or more processors of an OLT to receive a data pattern, embedded with a unique identifier, from an optical signal received during a quiet timeslot, wherein the quiet timeslot comprises a timeslot that is not allocated to any of a plurality of network interface devices for upstream transmission, and identify a rogue network interface device from the plurality of network interface devices as one of the network interface devices having a unique identifier that is same as the unique identifier embedded in the data pattern received during the quiet timeslot.

In one example, the disclosure describes a method of transmission for rogue network interface detection, the method comprising transmitting, with a controller of a network interface device, data received from one or more subscribers devices in timeslots assigned to the network interface device, and transmitting, with the controller, a unique identifier used to identify the network interface device during one or more timeslots to which the network interface device is not assigned.

In one example, the disclosure describes a network interface device comprising a laser driver, and a controller configured to transmit, to the laser driver, data received from one or more subscriber devices in timeslots assigned to the network interface device, and transmit, to the laser driver, a unique identifier used to identify the network interface device during one or more timeslots to which the network interface device is not assigned. Wherein the laser driver is configured to transmit the data received from the one or more subscriber devices in timeslots assigned to the network interface device, and transmit the unique identifier during the one or more timeslots to which the network interface device is not assigned.

In one example, the disclosure describes a method of rogue network interface device detection, the method comprising receiving, with an OLT, a data pattern in an optical signal received during a quiet timeslot, wherein the quiet timeslot comprises a timeslot that is not allocated to any of a plurality of network interface devices, with which the OLT is associated, for upstream transmission, determining that a rogue network interface device from which the optical signal is received during the quiet timeslot is not a network interface device to which the OLT is configured to transmit downstream data based on the received data pattern, and communicating with one or more other OLTs information to quarantine the rogue network interface device.

In one example, the disclosure describes an OLT comprising a memory configured to store information, and one or more processors configured to receive a data pattern in an optical signal received during a quiet timeslot, wherein the quiet timeslot comprises a timeslot that is not allocated to any of a plurality of network interface devices, with which the OLT is associated, for upstream transmission, determine that a rogue network interface device from which the optical signal is received during the quiet timeslot is not a network interface device to which the OLT is configured to transmit downstream data based on the received data pattern and the stored information, and communicate with one or more other OLTs information to quarantine the rogue network interface device.

In one example, the disclosure describes a system comprising a first OLT, a set of network interface devices associated with the first OLT, and a second OLT. The first OLT is configured to receive a data pattern in an optical signal received during a quiet timeslot, wherein the quiet timeslot comprises a timeslot that is not allocated to any of the set of network interface devices, associated with the first OLT, for upstream transmission, determine that a rogue network interface device from which the optical signal is received during the quiet timeslot is not a network interface device of the set of network interface devices based on the received data pattern, and communicate with the second OLT information to quarantine the rogue network interface device.

In one example, the disclosure describes an OLT comprising means for receiving a data pattern in an optical signal received during a quiet timeslot, wherein the quiet timeslot comprises a timeslot that is not allocated to any of a plurality of network interface devices, with which the OLT is associated, for upstream transmission, means for determining that a rogue network interface device from which the optical signal is received during the quiet timeslot is not a network interface device to which the OLT is configured to transmit downstream data based on the received data pattern, and means for communicating with one or more other OLTs information to quarantine the rogue network interface device.

In one example, the disclosure describes a computer-readable storage medium having instructions stored thereon that when executed cause one or more processors of an OLT to receive a data pattern in an optical signal received during a quiet timeslot, wherein the quiet timeslot comprises a timeslot that is not allocated to any of a plurality of network interface devices, with which the OLT is associated, for upstream transmission, determine that a rogue network interface device from which the optical signal is received during the quiet timeslot is not a network interface device to which the OLT is configured to transmit downstream data based on the received data pattern, and communicate with one or more other OLTs information to quarantine the rogue network interface device.

In one example, the disclosure describes a method comprising receiving, with a network interface device, one or more requests from an OLT to determine whether the network interface device transmitted one or more optical signals during one or more timeslots assigned to the network interface device for upstream transmission, determining, with the network interface device, that the network interface device transmitted the one or more optical signals during one or more timeslots assigned to the network interface device for upstream transmission, determining that the network interface device is transmitting the one or more optical signals at a wavelength that the OLT does not receive based on the determination that the network interface device transmitted the one or more optical signals during one or more timeslots assigned to the network interface device for upstream transmission, and the reception of the one or more requests from the OLT, and disabling the network interface device from transmitting upstream optical signals based on the determination that the network interface device is transmitting the one or more optical signals at the wavelength that the OLT does not receive.

In one example, the disclosure describes a network interface device comprising a laser, and a controller configured to receive one or more requests from an OLT to determine whether the laser transmitted one or more optical signals during one or more timeslots assigned to the network interface device for upstream transmission, determine that the laser transmitted the one or more optical signals during one or more timeslots assigned to the network interface device for upstream transmission, determine that the laser is transmitting the one or more optical signals at a wavelength that the OLT does not receive based on the determination that the laser transmitted the one or more optical signals during one or more timeslots assigned to the network interface device for upstream transmission, and the reception of the one or more requests from the OLT, and disable the network interface device from transmitting upstream optical signals based on the determination that the laser is transmitting the one or more optical signals at the wavelength that the OLT does not receive.

In one example, the disclosure describes a network interface device comprising means for receiving one or more requests from an OLT to determine whether the network interface device transmitted one or more optical signals during one or more timeslots assigned to the network interface device for upstream transmission, means for determining that the network interface device transmitted the one or more optical signals during one or more timeslots assigned to the network interface device for upstream transmission, means for determining that the network interface device is transmitting the one or more optical signals at a wavelength that the OLT does not receive based on the determination that the network interface device transmitted the one or more optical signals during one or more timeslots assigned to the network interface device for upstream transmission, and the reception of the one or more requests from the OLT, and means for disabling the network interface device from transmitting upstream optical signals based on the determination that the network interface device is transmitting the one or more optical signals at the wavelength that the OLT does not receive.

A computer-readable storage medium having instructions stored thereon that when executed cause a controller of a network interface device to receive one or more requests from an OLT to determine whether the network interface device transmitted one or more optical signals during one or more timeslots assigned to the network interface device for upstream transmission, determine that the network interface device transmitted the one or more optical signals during one or more timeslots assigned to the network interface device for upstream transmission, determine that the network interface device is transmitting the one or more optical signals at a wavelength that the OLT does not receive based on the determination that the network interface device transmitted the one or more optical signals during one or more timeslots assigned to the network interface device for upstream transmission, and the reception of the one or more requests from the OLT, and disable the network interface device from transmitting upstream optical signals based on the determination that the network interface device is transmitting the one or more optical signals at the wavelength that the OLT does not receive.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
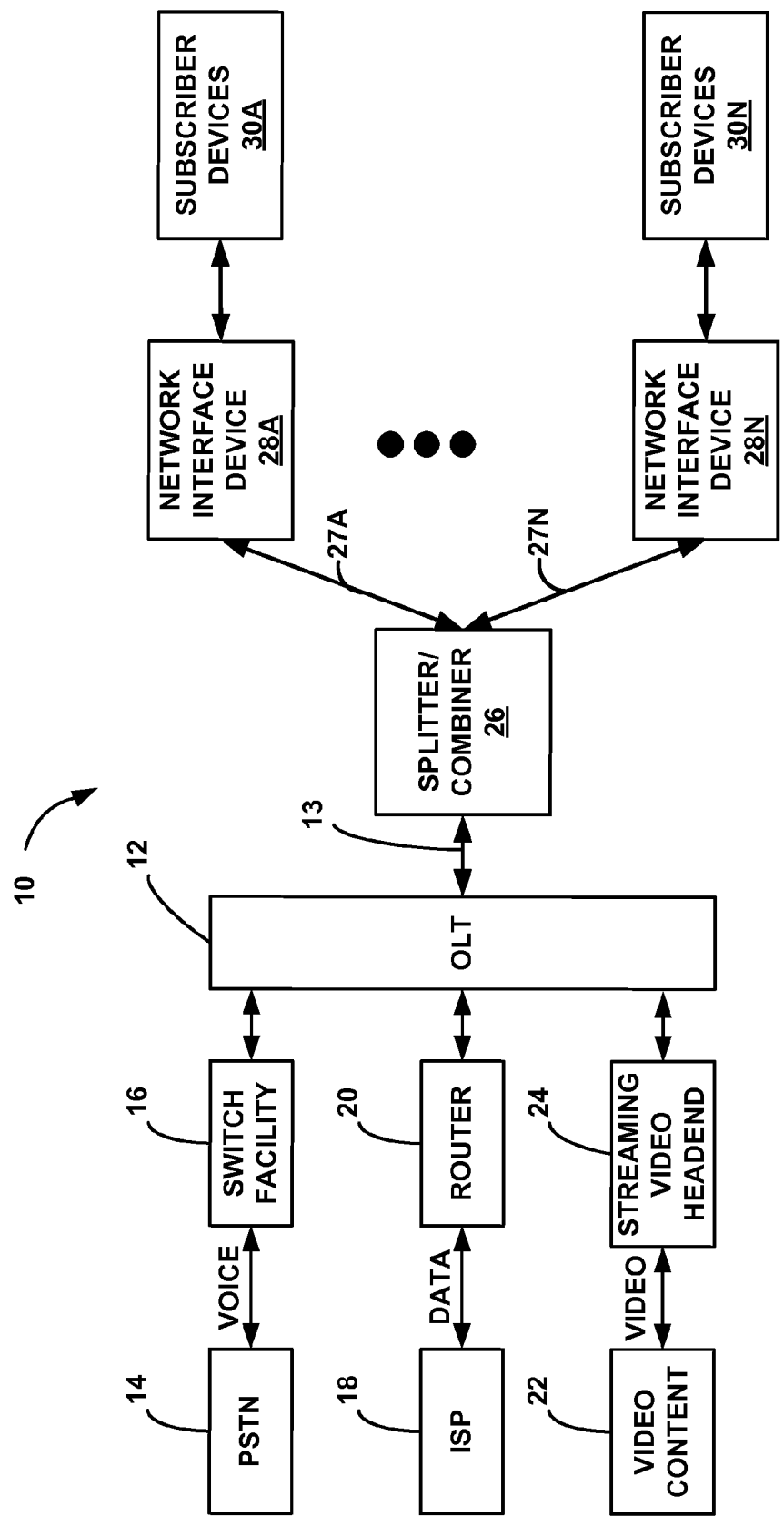
FIG. 1 is a block diagram illustrating a network, in accordance with one or more aspects of this disclosure.

An optical network includes an optical line terminal (OLT), an optical splitter/combiner, and a plurality of network interface devices such as optical network units (ONUs), also referred to as optical network terminals (ONTs). The OLT connects to the optical splitter/combiner with a fiber link, and each one of the network interface devices connect to the optical splitter/combiner with respective fiber links. In other words, there is a fiber link from OLT to optical splitter/combiner, and a plurality of fiber links (a fiber link for each network interface device) from the optical splitter/combiner to the network interface devices.

For downstream transmission, the OLT outputs an optical signal to the optical splitter/combiner, and the optical splitter/combiner transmits the optical signal to each network interface device via respective fiber links. Each of the network interface devices determine whether the received optical signal is addressed to it or to another network interface device. The network interface devices process the optical signal when the optical signal is addressed to it.

For upstream transmission, each network interface device transmits a respective optical signal to the optical splitter/combiner, and the optical splitter/combiner combines the optical signal for transmission to the OLT. Each network interface device may reside at a subscriber premises, or a plurality of subscriber premises may share a common network interface device. Each network interface device receives data from devices at one or more subscriber premises, converts the received data into the optical signal, and outputs the optical signal to the OLT via respective fiber links and the optical splitter/combiner.

To avoid collision of the optical signals from respective network interface devices, each network interface device may transmit the optical signal within an assigned timeslot. For example, the OLT may assign each of the network interface devices a timeslot within which to transmit respective optical signals, and each network interface device transmits its optical signal within the begin and end time of the assigned timeslot. The assigned timeslot is reserved for an upstream transmission from a given network interface device.

For example, each network interface device includes a controller, a laser driver, and a laser. The laser driver includes a laser control input, which may be a differential input, and based on the laser control input causes the laser to output an optical signal or not output an optical signal (e.g., turn on or turn off the laser based on the laser control input). When the laser is turned on, the laser is able to output an optical signal including optical ones and optical zeros. When the laser is turned off, the laser cannot output an optical signal and is essentially dark.

The controller for a given network interface device receives the information from the OLT that identifies the timeslot when the network interface device is to transmit an optical signal. The controller then outputs a voltage (e.g., a digital high) to the laser control input of the laser driver to instruct the laser driver to turn on the laser so that the laser outputs an optical signal during the assigned timeslot (e.g., outputs a digital high at the beginning of the timeslot). When the network interface device is not to transmit an optical signal (e.g., during non-assigned timeslots or at the conclusion of the timeslot), the controller outputs a voltage (e.g., a digital low) to the laser control input of the laser driver to instruct the laser driver to turn off the laser so that the laser does not output an optical signal during the non-assigned timeslots.

However, in some cases, one or more of the network interface devices may malfunction and transmit optical signals in timeslots to which the network interface devices are not assigned. As one example, a mechanical malfunction at the laser control input may result in the controller instructing the laser driver to cause the laser to not output an optical signal (e.g., turn off the laser), but the laser driver still causes the laser to output an optical signal (e.g., keeps the laser turned on). As another example, an electrical malfunction within the laser driver may result in the laser driver not turning off the laser during a non-assigned timeslot even when the controller outputs a digital low instructing the laser driver to turn off the laser. In general, there may be various causes for why a laser outputs an optical signal at unassigned timeslots.

In the techniques described in this disclosure, a network interface device whose laser is energized (e.g., turned on) outside of the control of the controller is referred to as a rogue network interface device. In other words, when the laser is non-responsive to the control of the controller, the network interface device is referred to as a rogue network interface device. For instance, when a laser is outputting an optical signal even when the controller is instructing the laser driver to turn off the laser or should be instructing the laser driver to turn off the laser, the network interface device that includes the controller is referred to as a rogue network interface device.

In some examples, the rogue network interface device outputs an optical signal during a non-assigned timeslot that interferes (e.g., collides) with the optical signal transmitted by another network interface device. In some cases, the rogue network interface device may output an optical signal during all timeslots so that the optical signal outputted by the rogue network interface device interferes with the optical signals from each of the other network interface devices that are properly transmitting in their own reserved timeslots.

The OLT may be configured to determine whether a rogue network interface device exists in the optical network. As one example, when assigning timeslots to the network interface devices, the OLT may reserve a timeslot that is not assigned to any of the network interface devices, referred to as a quiet timeslot in this disclosure. For example, when assigning timeslots, the OLT allocates bandwidth to each of network interface devices. Bandwidth that is not allocated to any of the network interface devices (e.g., unassigned allocation) may include the quiet timeslot. In this disclosure, the term "unassigned allocation" may also be used to refer to the quiet timeslot.

Some rogue network interface devices may always transmit an optical signal, and may transmit an optical signal during the reserved timeslot that is not assigned to any of the network interface devices (e.g., during the quiet timeslot). In some other techniques, the optical signal may be noise (e.g., no coherent data) with a certain amount of optical power. The OLT may determine whether an optical signal is received in the quiet timeslot based on the amount of optical power received in the quiet timeslot, and if an optical signal is received in the quiet timeslot, determines that a rogue network interface device exists in the optical network.

While the OLT may determine that a rogue network interface device exists in the optical network, it may be unknown which network interface device is the rogue network interface device. This disclosure describes examples ways to determine which network interface device is the rogue network interface device. As described in more detail, the controller of each network interface device may be configured to instruct the laser driver to turn off the laser during the non-assigned timeslot, but also output a predefined data pattern to the laser driver during the non-assigned timeslot. For the properly functioning network interface devices, the predefined data pattern will not propagate as an optical signal because the laser is off and under control of the controller. However, for the rogue network interface device, the predefined data pattern will propagate as an optical signal because the laser is on (when it should be off) and not under control of the controller.

The OLT may determine which network interface device is the rogue network interface device based on the optical signal received in the quiet timeslot. As one example, the predefined data pattern may be a unique identifier of the network interface device used for rogue network interface device identification, where each controller outputs a different, unique data pattern. The unique data pattern serves as a unique identifier that identifies a respective network interface device. In this example, the OLT may determine which network interface device is the rogue network interface device based on the unique identifier embedded in the optical signal received in the quiet timeslot.

As another example, the OLT may utilize two different predefined data patterns (e.g., a first predefined data pattern and a second predefined data pattern used for rogue network interface device identification). The first predefined data pattern may have a first transitional density (e.g., a ratio of the number of ones to zeros in the data pattern). This data pattern may be the same for each of the network interface devices, or the transitional density may be the same even if the pattern is different. The second predefined data pattern may be the same for each controller, and may have a second, different transitional density than the first transitional density.

In this example, the OLT may instruct each of the network interface devices to output the first predefined data pattern during timeslots to which the network interface devices are not assigned. The OLT may then determine the transitional density of the optical signal received during the quiet timeslot. Again, for the properly functioning network interface devices, the first predefined data pattern will not propagate as an optical signal because their lasers are off, but the first predefined data pattern will propagate as an optical signal from the rogue network interface device because its laser is turned on, even though it should be turned off.

Then, the OLT may perform a linear search to identify the rogue network interface device. For example, the OLT may instruct the first network interface device to switch from the first predefined data pattern to the second predefined data pattern, but may not instruct any of the other network interface devices to switch. Instead, the other network interface devices may continue to transmit the first predefined data pattern. The OLT may then determine the transitional density received during the quiet timeslot. In this example, the controller of the first network interface device outputs the second predefined data pattern to the laser driver during timeslots to which the first network interface device is not assigned.

If the first network interface device were the rogue network interface device, then the transitional density of the optical signal in the quiet timeslot would be different, as compared to when the OLT received the first predefined data pattern propagated as an optical signal in the quiet timeslot. Because the first network interface device, as a rogue device, is transmitting in the quiet timeslot, when it should not be transmitting, a change in the transitional density of the first and second predefined data patterns generated by the first network interface device can be detected. In this case, the OLT may determine that the first network interface device is the rogue network interface device.

If the first network interface device were not the rogue network interface device, then the transitional density of the optical signal in the quiet timeslot would be the same as when the OLT received the first predefined data pattern propagated as an optical signal in the quiet timeslot. The reason for this is that only the first network interface device switched from the first predefined data pattern to the second predefined data pattern. Therefore, if the transitional density in the quiet timeslot did not change, one of the other network interface devices is transmitting the first predefined data pattern in the quiet timeslot.

If the OLT determines that the first network interface device is not the rogue network interface device, the OLT may cause the second network interface to switch from the first predefined data pattern to the second predefined data pattern and repeat the above techniques described with respect to the first network interface device. The OLT may repeat these techniques until the OLT eliminates from consideration the non-rogue network interface devices and thereby identifies the rogue network interface device.

In the above examples, the controllers of the network interface devices are configured to output the predefined data pattern (e.g., the unique identifier or first or second data patterns with different transitional density) during timeslots that are not assigned to the network interface devices. During timeslots assigned to a network interface device, the network interface device may convert the data received from the devices at the one or more subscriber premises into an optical signal and output the optical signal.

For example, if a first network interface device is not a rogue network interface device, during timeslots not assigned to the first network interface device, the controller of the first network interface device outputs a predefined data pattern (as described above) to the laser driver, but this predefined data pattern does not get converted to an optical signal because the laser is turned off. During timeslots assigned to the first network interface device, the controller of the first network interface device outputs the data received from devices at the one or more subscriber premises that use the first network interface device for upstream transmission, converts the data into an optical signal, and outputs the optical signal.

If a second network interface device is a rogue network interface device, during timeslots not assigned to the second interface device, the controller of the second network interface device outputs a predefined data pattern (as described above) to the laser driver, and this predefined data pattern gets converted to an optical signal and outputted because the laser is turned on even though it should be turned off. During timeslots assigned to the second network interface device, the controller of the second network interface device outputs the data received from devices at the one or more subscriber premises that use the second network interface device for upstream transmission, converts the data into an optical signal, and outputs the optical signal.

In this manner, the techniques allow for rogue network interface device detection without needing to disable the upstream data transmission from the network interface devices. For instance, it may be possible to disable the upstream data transmission of each of the network interface devices upon detection of a rogue network interface device. Then, the OLT turns on each network interface device one at a time and determines whether an optical signal exists in the quiet timeslot to identify the rogue network interface device. However, such techniques require interrupting the transmission of upstream data until the rogue network interface device is identified. Such interruption of transmission negatively impacts the performance of the optical network (e.g., the subscriber devices cannot transmit upstream data for an extended period of time). With the techniques described in this disclosure, such interruption of transmission may not be needed. For instance, in some examples, if the techniques described in this disclosure are not able to accurately identify the rogue network interface device are the techniques of sequentially disabling network interface devices employed.

Disabling upstream transmission of a network interface device should not be confused as turning off the laser during timeslots not assigned to a network interface device. For instance, disabling upstream transmission of a network interface device is a hard shutdown of the upstream transmission such as by disabling power to the laser driver or the laser. When the laser is turned off or attempted to be turned off during timeslots not assigned to a network interface device, the laser driver is controlling the current flowing through the laser to be very small. In this way, it may still be possible to disable upstream transmission of a rogue network interface device even if the controller is unable to control when the laser is to turn off.

Some other techniques have also been proposed to identify the rogue network interface device without needing to disable the network interface devices. These other techniques store a look-up table of the optical power delivered by each of the network interface devices, measure the optical power of the optical signal received in the quiet timeslot, and compare the measured optical power to the optical power delivered by each of the network interface devices to identify the rogue network interface device. In these other techniques that rely on optical power, the optical signal received in the quiet timeslot is a noisy optical signal, meaning that there is no discernible or recoverable data pattern embedded in the optical signal, but instead includes random optical ones and zeros over the entire frequency range.

However, relying on optical power to identify the rogue network interface device may not function well. For instance, many of the network interface devices may deliver approximately the same amount of optical power, and determining which one of these network interface devices is the rogue network interface device may still require disabling upstream transmission, albeit for a smaller set of network interface devices. Also, the OLT may include an optical interface module (OIM) circuitry that includes a signal strength meter to detect the instantaneous optical power (e.g., real-time). However, the OIM detection circuitry, from which the signal strength is determined, may be fairly imprecise, with a relatively large margin of error. Furthermore, while handheld optical meters may be fairly precise, these handheld optical meters measure an average of the optical power (e.g., not real-time), when instantaneous power measurements are needed, and require disconnection of the fiber link for connection with the optical meter. Accordingly, in these other techniques, it may be difficult to determine which network interface device is the rogue network interface device because power measurement may not be precise, or otherwise impractical to obtain, making it difficult to distinguish between different network interface devices.

The above examples may be extended to multiple wavelength systems. An example of a multiple wavelength system is the ITU-T G.989 (NGPON-2) standard. In a multiple wavelength system, there may exist a plurality of OLTs (e.g., at different geographical locations, different OLT cards within the same chassis, or other configurations with multiple OLTs). In some examples of the multiple wavelength system, there may be one OLT that is configured to transmit and receive optical signals via multiple different wavelengths. For ease of illustration, the examples are described with respect to there being multiple OLTs in a multiple wavelength system.

In a multiple wavelength system, each OLT of a plurality of OLTs is associated with a set of all network interface devices and communicates (e.g., transmits and receives) only with the network interface devices within the associated set. For example, in the multiple wavelength system, a first OLT is associated with a first set (e.g., group) of one or more network interface devices and communicates with the one or more network interface devices that belong to the first set. In the multiple wavelength system, a second OLT is associated with a second set of different one or more network interface devices and communicates with the one or more network interface devices that belong to the second set, and so forth. After initialization and assignment of network interface devices to OLTs, an OLT may not be able to transmit downstream optical signals to a network interface device to which it is not associated. In general, after initialization and assignment of network interface devices to OLTs, a network interface device should not transmit upstream optical signals to an OLT to which it is not associated.

To effectuate such communication, each OLT may be assigned different upstream/downstream wavelength pairs, and each set of network interface devices may be assigned different upstream/downstream wavelength pairs relative to the other sets of network interface devices. As an example, a first OLT may be configured to transmit downstream optical signals at a first downstream wavelength, and receive upstream optical signals at a first upstream wavelength. The first set of network interface devices, associated with the first OLT, may be configured to receive downstream optical signals at the first downstream wavelength, and transmit upstream optical signals at the first upstream wavelength.

A second OLT may be configured to transmit downstream optical signals at a second downstream wavelength, and receive upstream optical signals at a second upstream wavelength. The second set of network interface devices, associated with the second OLT, may be configured to receive downstream optical signals at the second downstream wavelength, and transmit upstream optical signals at the second upstream wavelength, and so forth. In this example, each of the wavelengths is different than the others. For instance, the first downstream wavelength is different than the second downstream wavelength, the first upstream wavelength, and the second upstream wavelength, and the same is true for the second downstream wavelength, the first upstream wavelength, and the second upstream wavelength.

In some examples, in a multiple wavelength system, a network interface device in a first set of network interface devices may become rogue (e.g., transmit upstream optical signals during one or more timeslots to which it is not assigned). In this example, the first OLT may be able to identify which network interface device in the first set of network interface devices is rogue using the example techniques described above.

However, in some cases, in addition to becoming rogue, a network interface device may also transmit upstream optical signals at a wavelength to which it is not assigned. For instance, the network interface devices may be tunable to distinct upstream and downstream wavelengths, and may be tuned to transmit and receive optical signals at the assigned upstream and downstream wavelengths, respectively. However, external factors or some other error may cause a network interface device to become un-tuned and begin transmitting upstream optical signals at a different wavelength.

For example, a network interface device in a first set may begin to transmit upstream optical signals at an upstream wavelength assigned to network interface devices in a second set. In this example, the first OLT may not receive the upstream optical signals from this network interface device in the first set, and instead, the second OLT may receive the upstream optical signals from this network interface device in the first set.

In some examples, if a network interface device becomes rogue and transmits upstream optical signals at an upstream wavelength to which it is not assigned, an OLT, other than the OLT to which the network interface device is assigned, will receive the optical signal the quiet timeslot. In this case, the OLT will receive optical signals in the quiet timeslot, and determine that a rogue network interface device exists. However, because the rogue network interface device is not a network interface device associated with (e.g., assigned to) the OLT that determined that a rogue network interface device exists, the OLT may not be able to quarantine the rogue network interface device or cause the rogue network interface device to switch between predefined data patterns.

In accordance with the techniques described in this disclosure, for the multiple wavelength system, each of the OLTs may be configured to transmit and receive data from one another in an out of band communication. In these examples, the OLT that determined that a rogue network interface device exists is referred to as a detector OLT, and the OLT that is able to communicate with the rogue network interface device is referred to as a controller OLT. For instance, if the rogue network interface device is transmitting upstream optical signals to the OLT with which it is associated (e.g., to which it is assigned), then the detector OLT and the controller OLT are the same OLT. However, if the rogue network interface device is transmitting upstream optical signals with which it is not associated, then the detector OLT becomes the OLT that receives the optical signals from the rogue network interface device, and the controller OLT becomes the OLT with which the network interface device is associated. The detector OLT and the controller OLT may together identify the rogue network interface device.

For instance, in the example where the controllers of the network interface devices are configured to transmit a unique identifier during one or more timeslots to which the network interface devices are not assigned, the detector OLT may determine (e.g., reconstruct) the unique identifier from the optical signal received in the quiet timeslot. The detector OLT may determine whether the unique identifier is for a network interface device with which the OLT is associated. If the detector OLT determines that the unique identifier is for a network interface device with which the OLT is associated, the detector OLT may quarantine the rogue network interface device.

If the detector OLT determines that the unique identifier is for a network interface device with which the OLT is not associated, in one example, the detector OLT may determine with which OLT the rogue network interface device is associated (e.g., which is the controller OLT). For instance, each OLT may store a look up table that identifies all of the network interface devices associated with respective OLTs, and the detector OLT may determine with which OLT the rogue network interface device is associated based on the look up table (e.g., determine the controller OLT for the rogue network interface device). The detector OLT may then indicate to the determined controller OLT that the network interface device identified by the reconstructed unique identifier is rogue.

In some examples, instead of or in addition to determining the controller OLT, the detector OLT may broadcast a signal to each of the other OLTs that includes the unique identifier of the rogue network interface device and that requests that the OLT associated with the rogue network interface device disable the rogue network interface device. In this example, each of the OLTs that received the signal may determine whether it is the controller for the rogue network interface device.

As described above, in some examples, rather than using a unique identifier or if using the unique identifier is not successful, an OLT may request for each controller of each of the network interface devices to transmit a signal with a first transitional density during one or more timeslots to which the network interface devices are not assigned. The OLT may determine the transition density of the received optical signal in the quiet timeslot, and then instruct each controller of each network interface device to transmit a signal with a second transitional density, one at a time, during timeslots to which the network interface devices are not assigned. Based on when there is a change in the transition density of the optical signal received in the quiet timeslot, the OLT may determine which network interface device is the rogue network interface device.

In the context of multiple wavelength system, the detector OLT may instruct each of the other OLTs to instruct each of the controllers of their network interface devices to transmit signals with the first transitional density. The detector OLT may determine the transition density of the optical signal received in the quiet timeslot. The detector OLT may then request a first OLT to instruct a controller of a first network interface device associated with the first OLT to switch from the signal with the first transitional density to the signal with the second transitional density. The detector OLT may then determine whether there was a change in the transition density of the optical signal received in the quiet timeslot. If there is change in the transition density, the detector OLT may determine that the first network interface device of the first OLT is the rogue network interface device. If there is no change in the transition density, the detector OLT may request the first OLT to instruct a controller for a second network interface device associated with the first OLT to switch from the signal with the first transitional density to the signal with the second transitional density.

The detector OLT may repeat these steps until the rogue network interface device is identified, or until the controllers of all network interface devices associated with the first OLT have transmitted the signal with the second transitional density. If the controllers of all network interface devices associated with the first OLT have transmitted the signal with the second transitional density, and there has been no change in the transition density of the optical signal received in the quiet timeslot by the detector OLT, then the detector OLT may request the second OLT to instruct the controller of the first network interface device associated with the second OLT to transmit the optical signal with the second transition density, and so forth, until the transition density of the optical signal received in the quiet timeslot of the detector OLT changes.

In this manner, it may be possible to identify the rogue network interface device in the multiple wavelength system. For example, the detector OLT may receive a data pattern in an optical signal received from one of a plurality of network interface devices with which the detector OLT is not configured to communicate in a quiet timeslot. The detector OLT may communicate (e.g., interface) with one or more other OLTs (e.g., one or more controller OLTs) for determining which one of the network interface devices transmitted the optical signal during the quiet timeslot based on the data pattern to identify a rogue network interface device.

In the above examples, a rogue network interface device transmits optical signals at timeslots to which it is not assigned. However, in some cases, a network interface device may be transmitting optical signals at timeslots to which it is assigned, but its laser may become un-tuned. The laser becoming un-tuned may cause the laser to transmit the optical signal to an OLT to which the network interface device is not associated. In some examples, the OLT associated with the network interface device may transmit a request to the network interface device to confirm whether the network interface device is transmitting optical signals during timeslots assigned to the network interface devices. In response to receiving the request, the network interface device may determine whether the network interface device is transmitting optical signals during its assigned timeslots. If the network interface device determined that it is transmitting optical signals during its assigned timeslots, but received the request from the OLT to which it is associated, the network interface device may determine that its laser is not transmitting at the correct wavelength. In such examples, in response, the network interface device may disable the upstream transmission.

FIG. 1 is a block diagram illustrating a network 10. For purposes of illustration, the example implementations described in this disclosure are described in context of an optical network (e.g., a passive optical network (PON)). Accordingly, network 10 may be referred to as PON 10.

However, aspects of this disclosure are not so limited, and can be extended to other types of networks such as cable or digital subscriber line (DSL) based networks, or Active Ethernet which may be considered as optical transmission and reception in accordance with the Ethernet protocol. Active Ethernet is defined by the IEEE 802.3ah standard (e.g., in clause 59 of the 802.3ah standard). Examples of network 10 also include shared-medium transports such as WiFi and RF/DOCSIS.

As shown in FIG. 1, PON 10 may deliver voice, data and video content (generally "information") to a number of network nodes via optical fiber links. In some examples, PON 10 may be arranged to deliver Internet Protocol television (IPTV) and other high speed information (e.g., information transmitted at approximately 200 Mbps or higher). PON 10 may conform to any of a variety of PON standards, such as the broadband PON (BPON) standard (ITU G.983), Ethernet PON (EPON), the gigabit-capable PON (GPON) standard (ITU G.984), or 10 giga-bit NGPON, as well as future PON standards under development by the Full Service Access Network (FSAN) Group, such as 10G GPON (ITU G.987), or other organizations.

Optical line terminal (OLT) 12 may receive voice information, for example, from the public switched telephone network (PSTN) 14 via a switch facility 16. In addition, OLT 12 may be coupled to one or more Internet service providers (ISPs) 18 via the Internet and a router 20. As further shown in FIG. 1, OLT 12 may receive video content 22 from video content suppliers via a streaming video headend 24. Video also may be provided as packet video over the Internet. In each case, OLT 12 receives the information, and distributes it along optical fiber link 13 to optical splitter/combiner 26.

Optical splitter/combiner 26 then distributes the information to network interface devices 28A-28N (collectively referred to as "network interface devices 28") via respective fiber optic links 27A-27N (collectively referred to as "fiber optic links 27"). In some examples, PON 10 includes 128 network interface devices 28; however, the aspects of this disclosure are not so limited. Also, network interface devices 28 may be referred to as optical network units (ONUs) or optical network terminals (ONTs).

A single network interface device 28 is an example of a network interface device. Other examples of a network interface device include, but are not limited to, a cable modem or a DSL modem. However, for purposes of illustration but without limitation, the example implementations described in the disclosure are described in the context of the network interface device being an ONU or ONT.

Each one of network interface devices 28 may reside at or near a subscriber premises that includes one or more subscriber devices 30A-30N (collectively referred to as "subscriber devices 30"). For instance, network interface device 28A resides at or near a subscriber premises that includes one or more subscriber devices 30A, and network interface device 28N resides at or near a subscriber premises that includes one or more subscriber devices 30N. The subscriber premises may be a home, a business, a school, or the like. A single network interface device 28 may be capable of transmitting information to and receiving information from one or more subscriber premises.

As illustrated, a single network interface device 28 may directly transmit information to or receive information from one or more subscriber devices 30 within the subscriber premises. Examples of the subscriber devices 30 include, but are not limited to, one or more computers (e.g., laptop and desktop computers), network appliances, televisions, game consoles, set-top boxes, wireless devices, media players or the like, for video and data services, and one or more telephones for voice services. Subscriber devices 30 may also include household appliances such as furnaces, washer and dryers, freezers, refrigerators, thermostats, lights, security systems, and the like.

OLT 12 transmits downstream information to and receives upstream information from network interface devices 28 via fiber link 13 coupled to splitter/combiner 26. Downstream information may be considered to be information transmitted by OLT 12 and received by network interface devices 28. Upstream information may be considered to be information transmitted by each one of network interface devices 28 and received by OLT 12. As illustrated in FIG. 1, optical splitter/combiner 26 may be coupled to each one of network interface devices 28 via respective optical fiber links 27.

In some examples, optical splitter/combiner 26 may be a passive splitter/combiner. A passive splitter/combiner may not need to be powered. For downstream transmission, including voice, video, and data information from OLT 12, optical splitter/combiner 26 receives the downstream information and splits the downstream information for downstream transmission to network interface devices 28 via respective fiber links 27. For upstream information, including voice and data information from each one of network interface devices 28, optical splitter/combiner 26 receives upstream information from network interface devices 28 via respective fiber links 27 and combines the upstream information for transmission to OLT 12.

In some examples, optical splitter/combiner 26 may not be a passive splitter/combiner, but rather an active splitter/combiner. In these examples, optical splitter/combiner 26 may be powered locally. In these examples, optical splitter/combiner 26 may function as a switch, router, multiplexer, and the like.

Network interface devices 28 receive and transmit information via respective fiber links 27. Also, OLT 12 receives and transmits information via fiber link 13. To differentiate between transmission and reception, each one of network interface devices 28 may be configured to transmit voice and data information with an optical signal with a wavelength of 1310 nanometer (nm), receive voice and data information with an optical signal with a wavelength of 1490 nm, and receive video information with an optical signal with a wavelength of 1550 nm. OLT 12 may be configured to receive voice and data information with an optical signal with a wavelength of 1310 nm, transmit voice and data information with an optical signal with a wavelength of 1490 nm, and transmit video information with an optical signal with a wavelength of 1550 nm. These wavelengths are provided merely as examples.

The specific transmit and receive wavelengths indicated above are provided for illustration purposes only. In different examples, network interface devices 28 and OLT 12 may be configured to transmit and receive information with optical signals at different wavelengths than those provided above. However, the transmission and reception wavelengths of the optical signals should be different.

Each one of network interface devices 28 may be configured to transmit upstream information according to time division multiple access (TDMA) techniques. For instance, OLT 12 may grant or assign to each of subscriber devices 30 certain timeslots during which to transmit upstream information. Each one of network interface devices 28 transmits information to OLT 12 based on the timeslots assigned to each of respective subscriber devices 30. The timeslot for each one network interface devices 28 may be different. In this manner, each one of network interface devices 28 may transmit information without collision of information from two or more different network interface devices 28 at splitter/combiner 26. Collision of information may occur if splitter/combiner 26 receives upstream information from two or more network interface devices 28 at the same time.

As one example of the TDMA techniques, when one of network interface devices 28 (e.g., network interface device 28A), is powered on for the first time, OLT 12 may perform an auto-ranging process, as is well known in the art. For instance, during the auto-ranging process, OLT 12 may calculate the total propagation delay (e.g., the total time it takes to transmit information to network interface device 28A and receive information from network interface device 28A). OLT 12 may perform similar auto-ranging process on each one of network interface devices 28.

After the auto-ranging process, OLT 12 may calculate an equalization delay for each one of network interface devices 28, utilizing techniques well known in the art. The equalization delay equalizes the propagation delay of each one of network interface devices 28, relative to the other network interface devices 28. OLT 12 may transmit the equalization delay to each one of network interface devices 28 utilizing a physical layer operations and maintenance (PLOAM) message or utilizing an ONU management control interface (OMCI) message.

Once all the equalization delays are calculated and transmitted to network interface devices 28, OLT 12 may grant the timeslots during which each one of network interface devices 28 should transmit data (e.g., an optical signal). OLT 12 may transmit a bandwidth map to each one of network interface devices 28 indicating the timeslots during which each one network interface devices 28 should transmit data. OLT 12 may transmit the bandwidth map utilizing a PLOAM or OMCI message, or other message. In this way, PON 10 utilizes time division multiplexing to precisely synchronize transmission from all ONTs (e.g., network interface devices 28) such that each ONT transmits during a window where all other ONTs are quiet.

However, because PON 10 is a shared medium for network interface devices 28, PON 10 may be susceptible to network outages due to a single misbehaved (e.g., malfunctioning) network interface device 28. For example, although each one of network interface devices 28 should output an optical signal representing the data received from subscriber devices 30 during its assigned timeslot, a malfunctioning network interface device 28 may transmit an optical during a timeslot to which it is not assigned.

For instance, each one of network interface devices 28 includes a controller, such as a media access control (MAC) controller, that instructs a laser driver to turn on the laser (e.g., energize the laser) during its assigned timeslot and to turn off the laser (e.g., de-energize the laser) during timeslots to which it is not assigned. In the techniques described in this disclosure, one of network interface devices 28 whose laser becomes energized outside the control of its controller is referred to as a rogue network interface device. For example, if the controller instructs the laser driver to turn off the laser, but the laser does not turn off, the laser may be considered as being energized outside the control of its controller (e.g., the laser driver is non-responsive to the instructions from the controller to turn off the laser).

The existence of a rogue network interface device in PON 10 may be a significant failure mode of PON 10. For example, the optical signal transmission from the rogue network interface device falls outside the allowed timeslots and is sent coincidently with the proper transmission from other ones of network interface devices 28. For example, network interface device 28A may be assigned a first timeslot in which to transmit an optical signal, and network interface device 28N may be assigned a second timeslot in which to transmit an optical signal. If network interface device 28A were a rogue network interface device, network interface device 28A may transmit an optical signal during the first timeslot, which will be data from subscriber devices 30A. In addition, network interface device 28A may transmit an optical signal during the second timeslot which coincides, and hence collides, with the optical signal of network interface device 28N, which will be data from subscriber devices 30N.

In this case, the optical signal outputted by network interface device 28A during the second timeslot (e.g., the timeslot to which network interface device 28A is not assigned) may be a noisy optical signal with random optical ones and zeros and not at a fixed data rate. This noisy optical signal from network interface device 28A mixes with optical signal from network interface device 28N in the second timeslot resulting in the inability of OLT 12 to properly reconstruct the data transmitted by subscriber devices 30N via network interface device 28N in the second timeslot (e.g., causing recovery issues at OLT 12). For example, there may be a significant number of bit-errors in the reconstructed data transmitted by subscriber devices 30N via network interface device 28N in the second timeslot.

In a point-to-point network, an uncontrolled laser of a rogue network interface device may only affect the rogue network interface device. However, in PON 10, an uncontrolled laser of a rogue network interface device may affect one or more of the other network interface devices 28. For example, if the laser of the rogue network interface device is always energized, then the rogue network interface device may output an optical signal in all of the timeslots, which will cause the optical signal of the rogue network interface device to collide with the optical signals from all other network interface devices 28. As described above, PON 10 may include 128 network interface devices 28, and it may be possible for the rogue network interface device to corrupt the upstream transmissions from all 127 other network interface devices 28.

OLT 12 may be configured to detect the existence of a rogue network interface device in PON 10. As one example way, in assigning each one of network interface devices 28 an upstream transmission timeslot, OLT 12 may reserve one timeslot that is not assigned to any of network interface devices 28, referred to as a quiet timeslot. For example, bandwidth not allocated to any of the network interface devices 28 may include the quiet timeslot. Accordingly, the term "unassigned allocation" may also refer to the quiet timeslot. If no rogue network interface device exists in PON 10, then there would be no optical signal during the quiet timeslot. If a rogue network interface device exists in PON 10, then there would be an optical signal during the quiet timeslot.

OLT 12 may be configured to determine whether OLT 12 received an optical signal during the quiet timeslot. If OLT 12 determines that an optical signal was received in the quiet timeslot, then OLT 12 determines that a rogue network interface device exists in PON 10. There may be other ways in which to determine the existence of a rogue network interface device, and the techniques described in this disclosure are not limited to any specific technique for determining the existence of the rogue network interface device.

While OLT 12 may determine that a rogue network interface device exists, OLT 12 may not be able to determine (e.g., identify) which one of network interface devices 28 is the rogue network interface device. This disclosure describes example techniques for identifying a rogue network interface device.

The disclosure describes an example of using self-identifying background patterns for rogue network interface device identification (referred to as the "self-identifying background patterns technique"). The disclosure also describes an example of using differential pattern transition density for rogue network interface device identification (referred to as the "differential pattern transition technique"). These example techniques may be used together or separately. For instance, in some examples, PON 10 may implement the self-identifying background patterns technique to identify the rogue network interface device, and may not implement the differential pattern transition density technique to identify the rogue network interface device. In some examples, PON 10 may implement the differential pattern transition density technique to identify the rogue network interface device, and may not implement the self-identifying background patterns technique to identify the rogue network interface device.

In some examples, PON 10 may implement the self-identifying background patterns technique to identify the rogue network interface device in a first phase, and if unsuccessful in identifying the rogue network interface device, implement the differential pattern transition density technique, or vice-versa. In examples where PON 10 implements the self-identifying background patterns technique and/or the differential pattern transition density technique, it may be possible for the technique(s) to be unsuccessful in identifying the rogue network interface device. In some examples, if one or both of the techniques are unable to identify the rogue network interface device, PON 10 may rely upon conventional techniques for rogue network interface detection.

However, identifying the rogue network interface device utilizing techniques described in the disclosure may provide advantages over identifying the rogue network interface device utilizing conventional techniques. The techniques described in this disclosure, including the self-identifying background patterns technique and the differential pattern transition density technique, cause controllers of network interface devices 28 to transmit to respective laser drivers a predefined data pattern during timeslots to which it is not assigned.

For properly functioning network interface devices 28 (e.g., non-rogue network interface devices 28), this predefined data pattern will not be converted to an optical signal because the laser will be turned off, as instructed by the controller. For the rogue network interface device, this predefined data pattern will be converted to an optical signal because the laser will be on, contrary to the instructions from the controller.

OLT 12 may receive an optical signal embedded with the predefined data pattern during the timeslot not assigned to any of network interface devices 28 (i.e., the quiet timeslot). For instance, because none of network interface devices 28 are to output an optical signal during the quiet timeslot, only the rogue network interface device may output an optical signal during the quiet timeslot. OLT 12 may then determine which one of network interface devices 28 is rogue (e.g., identify the rogue network interface device) by sampling the optical signal in quiet timeslot and recovering the predefined data pattern.

In the techniques described in this disclosure, during assigned timeslots, network interface devices 28 output optical signals based on the data received from subscriber devices 30. During all timeslots to which one of network interface devices 28 is not assigned, one of network interface devices 28 may output a predefined data pattern used for rogue network interface device identification. The other network interface devices 28 may function in a similar way. To avoid confusion with the data pattern that network interface devices 28 output during assigned timeslots, this disclosure may at times use the term "background pattern" or "off-pattern" to refer to the data pattern that each one of network interface devices 28 outputs during timeslots to which it is not assigned for rogue network interface device identification.

As an example, the controller of network interface device 28A may output the data pattern received from subscriber devices 30A during the timeslot assigned to network interface device 28A. During timeslots not assigned to network interface device 28A, the controller of network interface device 28A may output a background pattern (e.g., a predefined data pattern). Network interface devices 28B-28N may function in a similar manner, except their controllers output the data pattern received from respective subscriber devices 30B-30N.

In other words, in some examples, the controllers of network interface devices 28 may output a serialized data pattern independent of whether the laser is on or off. However, if the controller instructs the laser to be on, the controller may output the data received from respective subscriber devices 30. If the controller instructs the laser to be off, the controller may output the background or off-pattern (e.g., a predefined data pattern).

In some examples, the controllers of network interface devices 28 may already be configured to output background or off-patterns to respective laser drivers even when the controllers instructs the laser driver to turn off the laser (e.g., burst enable is in an off state, as described more below) to support calibration patterns during manufacturing. For instance, even if a controller instructs the laser driver to turn off the laser, the transmit data lines between the controller and the laser driver are active. In examples where the controllers are already configured to output background or off-patterns, these background or off-patterns may be programmable and/or selectable. In some examples, the background or off-patterns may be a pattern of all digital zeros since no valid data is being transmitted.

However, in the techniques described in this disclosure, the controller outputs a predefined data pattern as the background or off-pattern (e.g., rather than transmitting a pattern of all digital zeros). In some examples, the controllers may be configured to always or periodically output the predefined data pattern as the background pattern. In some examples, the controllers may be configured to output the predefined data pattern as the background pattern in response to OLT 12 indicating that a rogue network interface device exists. For instance, a proprietary physical layer operations, administration, and maintenance (PLOAM) message has been created per the G.984.3 standard to control the background pattern of network interface devices 28 (e.g., of the ONUs). If rogue detection is enabled, OLT 12 may send this PLOAM to all network interface devices 28 to turn on detectable background patterns. If rogue detection is disabled, OLT 12 may program network interface devices 28 to have a zero-pattern background since this is the least destructive pattern and well-suited when no rogue detection is enabled.

In the self-identifying background pattern technique, the predefined data pattern is different for each of network interface devices 28, and the predefined data pattern for one of network interface devices 28 functions as a unique identifier for that one of network interface devices 28 (e.g., as an ONU-ID). In some examples, the controller may be preprogrammed with the unique identifier for the one of network interface devices 28 to which the controller will belong. In some examples, OLT 12 may assign each one of network interface devices 28 with a unique identifier that the respective controllers store. There may be other ways in which network interface devices 28 are assigned unique identifiers, and the techniques described in this disclosure are not limited to any particular technique to assign unique identifiers to network interface devices 28.

In this example, the rogue network interface device will transmit its unique identifier as the predefined data pattern during timeslots to which the rogue network interface device is not assigned. OLT 12 may receive this unique identifier in the quiet timeslot as embedded in the optical signal, and OLT 12 may sample the optical signal to reconstruct the unique identifier. OLT 12 may then identify the rogue network interface device based on the reconstructed unique identifier. In other words, by programming a unique value into the background pattern that is related to the ONU-ID, OLT 12 can monitor for rogue power (e.g., power in the quiet timeslot) and sample the pattern to determine the ONU-ID of the rogue network interface device.

In other words, OLT 12 may receive a data pattern, embedded with a unique identifier, from an optical signal received during a quiet timeslot. As described above, the quiet timeslot is a timeslot that is not allocated to any of the plurality of network interface devices 28 for upstream transmission (i.e., none of network interface devices 28 is to transmit an optical signal during the quiet timeslot). OLT 12 may identify a rogue network interface device from the plurality of network interface devices 28 as one of the network interface devices having a unique identifier that is same as the unique identifier embedded in the data pattern received during the quiet timeslot.

In some examples, for confirmation that the identified network interface device truly is a rogue network interface device, OLT 12 may sample the optical signal in the quiet timeslot for multiple instances of the quiet timeslot. If the same network interface device is identified in the optical signals in each of the multiple instances of the quiet timeslot, OLT 12 may confirm that the identified network interface device is the rogue network interface device.

For example, assume that network interface device 28N is the rogue network interface device. In this example, during the first timeslot, network interface device 28A will output data from subscriber devices 30A, and network interface device 28N will output its unique identifier. During the second timeslot, network interface device 28N will output data from subscriber devices 30N. During the quiet timeslot, network interface device 28N will output its unique identifier (e.g., outputs an optical signal that includes the unique identifier). OLT 12 reconstructs the unique identifier from the optical signal and determines (e.g., identifies) network interface device 28N as the rogue network interface device based on the unique identifier. For instance, OLT 12 may identify network interface device 28N as the rogue network interface device because network interface device 28N has the same unique identifier as the unique identifier embedded in the data pattern received during the quiet timeslot. In some examples, OLT 12 may reconstruct the unique identifier in the quiet timeslot multiple times to confirm that network interface device 28N is the rogue network interface device. In other words, depending on the acceptable error rate, continuous sequential events may be advisable to eliminate false matches due to network interface devices 28 that are sending random data.

In some examples, the predefined data patterns that each includes embedded unique identifiers for network interface devices 28 may include the following example properties. These properties are provided for purposes of illustration only and should not be considered limiting.

As one example, the one/zero duty cycle of the data pattern of a unique identifier may be in the range of approximately 40% to 60%. The laser driver of each of network interface devices 28 may include an automatic power control (APC) loop that controls the amplitude of the current (e.g., bias current and/or modulation current) delivered to the laser. The APC loop may require sufficient data transitions in the data pattern to function properly. By having a duty cycle in the range of approximately 40% to 60%, there may be sufficient data transitions for the APC loop to function properly.

As another example, to indicate the end of the unique identifier within the predefined data pattern, the predefined data pattern of each of network interface devices 28 may include a framing delimiter, such as a 24-bit framing delimiter. Although the unique identifier for each of network interface devices 28 may be different, the framing delimiter may be the same for each of network interface devices 28.

In this manner, PON 10 utilizes the self-identifying background pattern technique to identify the rogue network interface device from network interface devices 28. In some examples, OLT 12 may be able to identify the rogue network interface device in the order of 10 milliseconds, rather than many hundreds or thousands of milliseconds, as is required from some other conventional techniques.

As described above, the optical signal from rogue network interface device collides with the optical signals from the other network interface devices 28, causing bit errors in the reconstruction of the optical signals from the non-rogue network interface devices. By identifying the rogue network interface device within 10 milliseconds, OLT 12 may be able to quarantine the rogue network interface device in the order of 10 milliseconds. The order of magnitude improvement using the self-identifying background patterns technique is directly related to the outage time subscriber devices 30 may experience when a rogue network interface device failure occurs.

For example, once OLT 12 identifies the rogue network interface device, OLT 12 may disable (e.g., quarantine) the rogue network interface device. OLT 12 may output an instruction to the rogue network interface to disable the upstream transmission so that there is no colliding with the optical signals of the non-rogue network interface devices. Disabling upstream transmission should not be confused with turning off the laser as part of transmitting data. For example, as normal part of data transmission, network interface devices 28 turn off their lasers during timeslots for which they are not assigned. Disabling upstream transmission may be considered as a hard shutdown of the laser. For example, in response to a request to disable upstream transmission, the controller of the rogue network interface device may turn off the power to the laser or turn off the power to the laser driver. In this way, the controller of the rogue network interface device may be able to disable upstream transmission even if the controller cannot control turning off the laser during timeslots for which it is not assigned.

Moreover, another advantage of the self-identifying background patterns techniques may be that the predefined data pattern includes a relatively high number of data transitions (e.g., one/zero transitions that provides 40% to 60% transitions). This allows OLT 12 to quickly detect the rogue condition. For instance, as described above, OLT 12 determines that a rogue network interface device exists when optical power is received in the quiet timeslot. With a high number of data transitions, OLT 12 may be able determine that optical power exists in the quiet timeslot more quickly than other background patterns. For instance, ONUs or ONTs that use an all-zero background pattern may be difficult to detect as rogue network interface devices because the optical power of an all zero pattern is low.

The preceding described an example of the self-identifying background patterns technique. The following describes an example of the differential pattern transition density technique. As described above, PON 10 may be configured to implement the self-identifying background patterns technique or the differential pattern transition density technique. In some examples, PON 10 may be configured to implement the self-identifying background patterns technique, and if the self-identifying background patterns technique is unable to identify the rogue network interface device, PON 10 may utilize the differential pattern transition density technique.

For example, as described above, the laser driver includes an APC loop that controls the amount of current flowing through the laser. In addition to relying on data transitions of the APC loop to function properly, in some examples, the APC loop may require the laser to turn off periodically, such as during timeslots not assigned to the one of network interface devices 28 that includes the laser driver, to function properly. For properly functioning (e.g., non-rogue) network interface devices 28, turning off the laser during timeslots not assigned to the one of network interface device 28 that includes the laser is sufficient to keep the APC loop of the laser driver functioning properly.

However, for the rogue network interface device, the APC loop may not function properly because the laser does not turn off and remains on at all timeslots. Because the APC loop does not function well for the rogue network interface device, the optical signal outputted by the rogue network interface device may be error prone. In other words, in some networks with a rogue network interface device, the APC loop has been compromised resulting in a very high error rate to OLT 12.

For instance, the optical signal representing the data from respective subscriber devices 30 may include errors causing OLT 12 to reconstruct data that is different from the data transmitted by the respective subscriber devices 30. In addition, if the rogue network interface device is transmitting a predefined data pattern that includes its unique identifier, a malfunctioning APC loop may result in OLT 12 being unable to properly reconstruct the received data pattern. For example, the identifier that OLT 12 reconstructs may not be the identifier of the rogue network interface device because the errors induced by the malfunctioning APC loop of the laser driver.

In the differential pattern transition density technique, OLT 12 may not rely on the precise digital bit values in the optical signal to determine which network interface device 28 is the rogue network interface device. Rather, OLT 12 may determine a change in transition density in the optical signal received in the quiet timeslot to identify the rogue network interface device (e.g., presence of a high error rate, uncontrolled laser of a rogue network interface device).

For example, during timeslots to which network interface devices 28 are not assigned, each one of network interface devices 28 may output a first predefined data pattern with a first data transition density, where the data transition density is equal to a ratio of logical ones (digital highs) to logical zeros (digital lows). This first predefined data pattern may be the same for all network interface devices 28. Even if the predefined data patterns are different for network interface devices 28, the data transition density may be the same for the data patterns for network interface devices 28.

In this example, OLT 12 may determine the data transition density of the received optical signal (e.g., ratio of received logical ones to received logical zeros). In this case, because of the compromised APC loop of the rogue network interface device, the data transition density of the optical signal received by OLT 12 in the quiet timeslot may be different than the data transition density of the first predefined data pattern transmitted by the controller of the rogue network interface device.

As an example, the transition density duty cycle of the first predefined data 25% or 75%, as two examples. In this example, if there is a 12% bit error rate, then the transition density measured by OLT 12 may be 38% (if originally 25%) or 63% (if originally 75%). The techniques described in this disclosure, even with a 12% bit error rate, OLT 12 may be able to determine which one of network interface devices 28 is the rogue network interface device. However, with a 12% bit error rate, OLT 12 may not be able to properly reconstruct the unique identifier of network interface devices 28 (e.g., be able to accurately determine which one is the rogue network interface device).

In the differential pattern transition density technique, OLT 12 may measure the transition density of the optical signal received in the quiet timeslot when controllers of network interface devices 28 are outputting the first predefined data pattern with the first transition density for timeslots to which they are not assigned. OLT 12 may store the measured transition density when the controllers of network interface devices 28 were outputting the first predefined data pattern during timeslots not assigned to network interface devices 28 to which the controllers belong.

OLT 12 may then perform a linear search to identify the rogue network interface device. For example, OLT 12 may cause network interface device 28A to output a second predefined data pattern with a second different transition density. In some examples, the transition density of first predefined data pattern and the second predefined data pattern may be sufficiently different (e.g., if the transition density of the first predefined data pattern is 25%, then the transition density of the second predefined data patter is 75%, or vice-versa). In some examples, while OLT 12 may cause the controller of network interface device 28A to output the second predefined data pattern in timeslots not assigned to network interface device 28A, the controllers of the remaining network interface devices 28 may keep outputting the first predefined data pattern during timeslots not assigned to the remaining network interface devices 28.

In this example, OLT 12 may measure the transition density in the quiet timeslot, and compare the measured transition density to the stored transition density. If the measured transition density is the same as the stored transition density, then OLT 12 may determine that network interface device 28A is not the rogue network interface device. This is because the controller of network interface device 28A is outputting the second predefined data pattern. If network interface device 28A were the rogue network interface device, then OLT 12 would measure a different transition density than the stored transition density since the second predefined data pattern would propagate as an optical signal in the quiet timeslot.

If the measured transition density is different than the stored transition density, then OLT 12 may determine that network interface device 28A is the rogue network interface device. This is because the controller of network interface device 28A is outputting the second predefined data pattern with a different transition density than the first predefined data pattern, and the controllers of the remaining network interface devices 28 are outputting the first predefined data pattern. If OLT 12 determines that the transition density of the received optical signal changed, then the cause of the change is most likely because network interface device 28A switched from outputting the first predefined data pattern to the second predefined data pattern.

In the case that network interface device 28A is not the rogue network interface device, OLT 12 may cause network interface device 28B to switch from the first predefined data pattern to the second predefined data pattern. OLT 12 may then repeat measuring the transition density, comparing the measured transition density to the stored transition density, and determining whether network interface device 28B is the rogue network interface device. If network interface device 28B is not the rogue network interface device, OLT 12 may keep searching through network interface devices 28 until the rogue network interface device is identified.

For example, OLT 12 may instruct controllers of network interface devices 28 to transmit a first data pattern having a first data transition density during timeslots to which network interface devices 28 are not assigned. OLT 12 may determine a data transition density of an optical signal received during the quiet timeslot when controllers of network interface devices 28 are transmitting the first data pattern during timeslots to which they are not assigned. OLT 12 may repeatedly instruct controllers of respective network interface devices 28 to sequentially transmit a second data pattern having a second data transition density during timeslots to which the respective network interface devices 28 are not assigned until the rogue network interface device is identified. OLT 12 may repeatedly determine a data transition density of an optical signal received during the quiet timeslot when one of the controllers of one of network interface devices 28 is transmitting the second data pattern having the second data transition density during timeslots to which it is not assigned until the rogue network interface device is identified. OLT 12 may determine that the network interface device that is transmitting the second data pattern having the second data transition density is the rogue network interface device based on the data transition density of the optical signal when network interface devices 28 were transmitting the first data pattern during timeslots to which they were not assigned being different than the data transition density of the optical signal when the rogue network interface device was transmitting the second data pattern during timeslots to which it was not assigned.

Because the differential pattern transition density technique does not require determining the precise digital bit values, the differential pattern transition density technique may function even under extreme signal degradation cases due to the APC loop of the rogue network interface device being saturated or compromised. Also, similar to above, once OLT 12 identifies the rogue network interface device, OLT 12 may disable (e.g., quarantine) the rogue network interface device as described above.

In both the self-identifying background patterns technique and the differential pattern transition density technique, OLT 12 may not need to stop upstream transmission of data from subscriber devices 30 while attempting to identify the rogue network interface device. For example, during timeslots assigned to network interface devices 28, network interface devices 28 keep outputting data from respective subscriber devices 30. In this way, no halt to upstream transmission services may be needed. Moreover, both of these techniques may reduce cost associated with network monitoring and manual isolation when problems arise from a rogue network interface device.

Some other techniques sequentially disable the laser to identify the rogue network interface device, which may take on the order of seconds to identify the rogue network interface device, and results in upstream data transmission interruption for seconds. For example, if there are 128 network interface devices, and the $128^{th}$ network interface device is the rogue network interface device, then until OLT 12 reaches the $128^{th}$ network interface device, the upstream transmission of the $128^{th}$ network interface device is halted.

Furthermore, in some cases, disabling a laser may clear the rogue behavior of rogue network interface device if the rogue behavior is due to a lockup in the laser average power loop. However, the rogue behavior may return. Therefore, disabling the laser may in some cases result in OLT 12 not being able to identify the rogue network interface device.

In the self-identifying background patterns technique, OLT 12 may be able to identify the rogue network interface device in the order of a few milliseconds, which is much better than the seconds that it takes the conventional techniques. In the differential pattern transition density technique, it may take OLT 12 the same amount of time to identify the rogue network interface device as the conventional technique. However, OLT 12 may not need to disable upstream transmission of network interface devices 28 until OLT 12 identifies the rogue network interface device.

Figure 2:
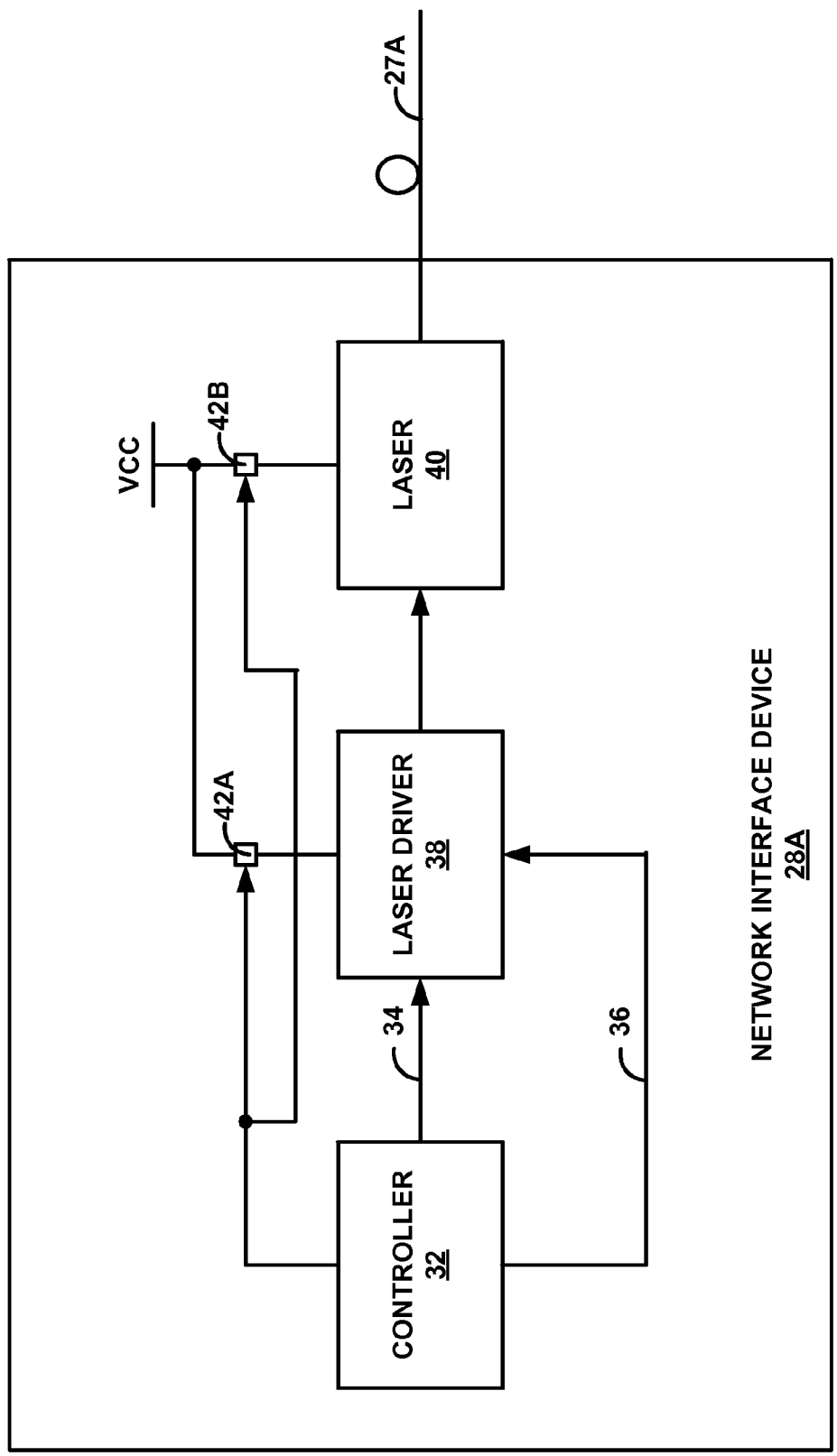
FIG. 2 is a block diagram illustrating an example of a network interface device in accordance with the techniques described in this disclosure.

FIG. 2 is a block diagram illustrating an example of a network interface device in accordance with the techniques described in this disclosure. For purposes of illustration, FIG. 2 illustrates network interface device 28A in greater detail. Network interface devices 28B-28N may be substantially similar to network interface device 28A.

As illustrated, network interface device 28A includes controller 32, laser driver 38, and laser 40 for upstream transmission. In addition, network interface device 28A includes components for receiving downstream transmission from OLT 12, such as a photodiode, a transimpedance amplifier (TIA), limiting amplifier, and a clock-and-data recovery (CDR) unit. The components used for receiving optical signals are not illustrated for ease of illustration. In general, even if network interface device 28A is a rogue network interface device, there may be no effect on the downstream transmission from OLT 12. Also, controller 32 may be a media access control (MAC) controller. In some examples, controller 32 may control both the upstream transmission and downstream reception for network interface device 28A. In some examples, network interface device 28A may include separate controllers for upstream and downstream.

Controller 32 may output data from subscriber devices 30, during timeslots assigned to network interface device 28A, or output one of the examples of predefined data patterns, during timeslots not assigned to network interface device 28A, via data line 34 to laser driver 38. In some examples, data line 34 may be differential data lines.

Also, controller 32 may output a control signal, via control line 36, to laser driver 38 to instruct laser driver 38 to turn on or turn off laser 40. In some examples, control line 36 may be differential control lines. During timeslots when network interface device 28A is to output an optical signal representing the data outputted by subscriber devices 30A, controller 32 may output a voltage as a control signal via control line 36 to instruct laser driver 38 to energize (turn on) laser 40. Laser driver 38 may control the amount of current that flows to laser 40 to cause laser 40 to output the optical signal via fiber link 27A that represents the data from subscriber devices 30A.

During timeslots when network interface device 28A is not to output an optical signal, controller 32 may output examples of the predefined data patterns described above, via data line 34, and also output a voltage as a control signal via control line 36 to instruct laser driver 38 to de-energize (turn off) laser 40. Even though controller 32 is outputting an example of the predefined data pattern via data line 34 to laser driver 38, because laser driver 38 turns off laser 40, the predefined data pattern may not propagate as an optical signal via fiber line 27A.

However, in some cases, controller 32 may instruct laser driver 38 to turn off laser 40, but laser 40 may not turn off (e.g., laser 40 is energized outside of the control of controller 32), resulting in network interface device 28A being a rogue network interface device. For instance, due to a mechanical malfunction between where control line 36 couples to laser driver 38, laser driver 38 may not receive the instruction to turn off laser 40, and may keep laser 40 turned on. As another example, due to an electrical malfunction of laser driver 38, laser driver 38 may be stuck in a state where laser driver 38 keeps laser 40 turned on, regardless of the control signal outputted by controller 32.

In accordance with the self-identifying background patterns technique, controller 32 may store the unique identifier for network interface device 28A. During timeslots not assigned to network interface device 28A, controller 32 may output the predefined data pattern that includes the unique identifier via data line 34 to laser driver 38 and an instruction to turn off laser 40 via control line 36. If laser 40 is not under control of controller 32 (e.g., laser 40 is still on), then laser 40 may output an optical signal that represents the predefined data pattern with the embedded unique identifier. OLT 12 may receive the predefined data pattern with the embedded unique identifier of network interface device 28A, and identify network interface device 28A as the rogue network interface device based on the unique identifier (e.g., identify a rogue network interface device 28A from the plurality of network interface devices 28 as one of the network interface devices having a unique identifier that is same as the unique identifier embedded in the data pattern received during the quiet timeslot).

In accordance with the differential pattern transition density technique, controller 32 may output a first predefined data pattern having a first data transition density during timeslots not assigned to network interface device 28A. Then, controller 32 may receive instruction from OLT 12, via a downstream reception which is unaffected even if network interface device 28A is rogue, to switch from the first predefined data pattern to a second predefined data pattern having a second data transition density. Controller 32 may output the second predefined data pattern during timeslots not assigned to network interface device 28A. If OLT 12 determines that there was a change in the data transition density of the optical signal received in the quiet timeslot after controller 32 switched to the second predefined data pattern, OLT 12 may identify network interface device 28A as the rogue network interface device.

In some examples, if network interface device 28A is identified as the rogue network interface device, OLT 12 may disable network interface device 28A (e.g., output instructions to quarantine the rogue network interface device). In general, to disable network interface device 28A, controller 32 may receive a downstream transmission to disable network interface device 28A. In response, controller 32 may open one or both of switches 42A and 42B to disable one or both of laser driver 38 and laser 40. There may be other ways in which to disable the rogue network interface device, and the preceding technique is one example way in which to disable the rogue network interface device.

Figure 3:
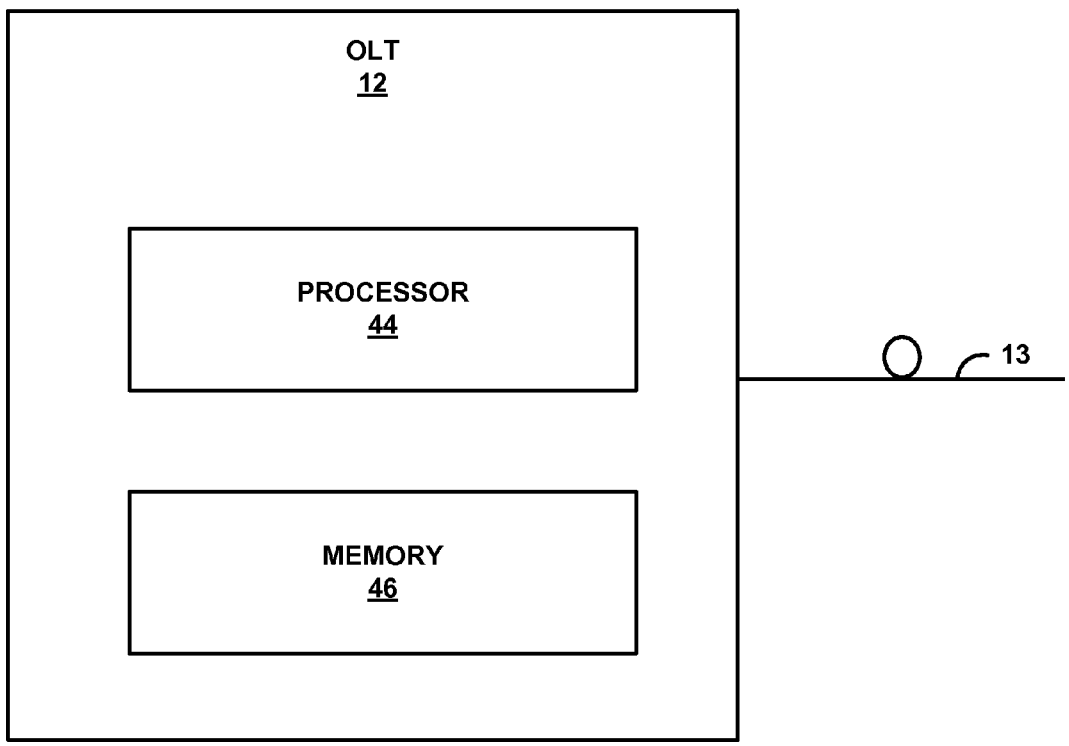
FIG. 3 is a block diagram illustrating an example of an optical line terminal (OLT) in accordance with the techniques described in this disclosure.

FIG. 3 is a block diagram illustrating an example of an optical line terminal (OLT) in accordance with the techniques described in this disclosure. As illustrated, OLT 12 includes processor 44 and memory 46, and transmits and receives optical signals via fiber link 13. In some examples, OLT 12 may include one or more processors, and processor 44 is illustrated as generically representing one or more processors. Processor 44 of OLT 12 may be configured to determine whether a rogue network interface device exists in PON 10. For example, processor 44 may assign each one of network interface devices 28 with a timeslot for outputting an optical signal for upstream transmission (e.g., assign allocation to each one of network interface devices 28), and reserve one timeslot as a timeslot where none of network interface devices 28 outputs an optical signal (e.g., the quiet timeslot, also referred to as unassigned allocation, that is not allocated to any of the plurality of network interface devices 28 for upstream transmission). Processor 44 may determine whether optical power exists in the quiet timeslot and determine that a rogue network interface device exists if there is sufficient optical power in the quiet timeslot.

In addition, processor 44 may be configured to determine which one of network interface devices 28 is the rogue network interface device utilizing the example techniques described in this disclosure. For instance, memory 46 stores values used to determine which one network interface devices 28 is the rogue network interface device, and processor 44 uses the stored values in memory 46 to identify the rogue network interface device.

For example, in the self-identifying background patterns technique, processor 44 may reconstruct the predefined data pattern with the embedded unique identifier from the optical signal received in the quiet timeslot. Memory 46 may store the unique identifiers for each of network interface devices 28, and processor 44 may compare the reconstructed unique identifier with the unique identifiers stored in memory 46 to determine which one of network interface devices 28 is the rogue network interface device.

In the differential pattern transition density technique, network interface devices 28 may be transmitting the first predefined data pattern having the first data transition density. Processor 44 may determine (e.g., measure) the data transition density of the optical signal received in the quiet timeslot, and store the determined data transition density in memory 46. Processor 44 may then instruct a first one of network interface devices 28 to transmit the second predefined data pattern having the second data transition density. Processor 44 may determine the data transition density of the optical signal received in the quiet timeslot when the first one of network interface devices 28 transmitted the second predefined data pattern. Processor 44 may compare the determined data transition density with the stored data transition density value, and based on the comparison determine whether the first one of network interface devices 28 is the rogue network interface device. If it is not, processor 44 may repeat the steps with the second one of network interface devices 28, and so forth, until processor 44 identifies the rogue network interface device.

In some examples, albeit not a requirement, processor 44 may first attempt the self-identifying background patterns technique to identify the rogue network interface device. If unsuccessful, processor 44 may attempt the differential pattern transition density technique. In this case, processor 44 may instruct the controllers of each one of network interface devices 28 to switch from the predefined data pattern that includes the unique identifier to the predefined data pattern having the first data transition density, and then cause the controller of each one of network interface devices 28 to sequentially or selectively (e.g., in a linear search) transmit the predefined data pattern having the second data transition density. In some examples, if processor 44 is still unable to identify the rogue network interface device, processor 44 may apply conventional techniques (e.g., disable network interface devices 28 and enable network interface devices 28, sequentially or selectively, until the rogue network interface device is identified).

Figure 4:
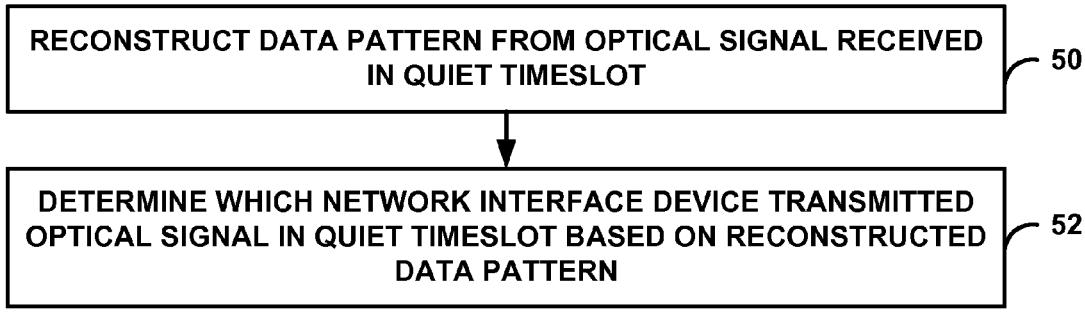
FIG. 4 is a flowchart illustrating an example method of operation of an OLT in accordance with techniques described in this disclosure.

FIG. 4 is a flowchart illustrating an example method of operation of an OLT in accordance with techniques described in this disclosure. In the example illustrated in FIG. 4, processor 44 of OLT 12 may reconstruct a data pattern from an optical signal received from one of a plurality of network interface devices 28 in a quiet timeslot (e.g., unassigned allocation), where none of network interface devices 28 are to transmit optical signals in the quiet timeslot (50). Processor 44 may determine which one of network interface devices 28 transmitted the optical signal during the quiet timeslot based on the reconstructed data pattern to identify a rogue network interface device (52).

For instance, to reconstruct the data pattern, processor 44 may be configured to reconstruct a unique identifier embedded in the data pattern. To determine which one of network interface devices 28 transmitted the optical signal in the quiet timeslot, processor 44 may be configured to compare the reconstructed unique identifier to unique identifiers for each of the network interface devices stored in memory 46, and determine which one of network interface devices 28 transmitted the optical signal during the quiet timeslot based on the comparison.

As another example, processor 44 may be configured to reconstruct a first data pattern from a first optical signal received in the quiet timeslot, and determine a first transition density of the reconstructed first data pattern. In this example, processor 44 may not need to resolve the specific bit values, and it may be sufficient that processor 44 is able to approximate the data transition density even if some of the bit values are incorrect.

Processor 44 may also be configured to instruct a controller of a first network interface device to transmit a second data pattern having a second transition density during one or more timeslots to which the first network interface device is not assigned (e.g., in a timeslot not reserved for the first network interface device). In this case, reconstructing the data pattern includes reconstructing the data pattern when the controller of the first network interface device is transmitting the second data pattern during timeslots to which the first network interface device is not assigned.

Processor 44 may determine a second transition density of the reconstructed data pattern when the controller of the first network interface device is transmitting the second data pattern during timeslots to which the first network interface device is not assigned, and compare the second transition density to the first transition density. In this example, to determine which one of the network interface devices transmitted the optical signal during the quiet timeslot, processor 44 may be configured to determine whether the first network interface device transmitted the optical signal in the quiet timeslot based on the comparison.

Figure 5:
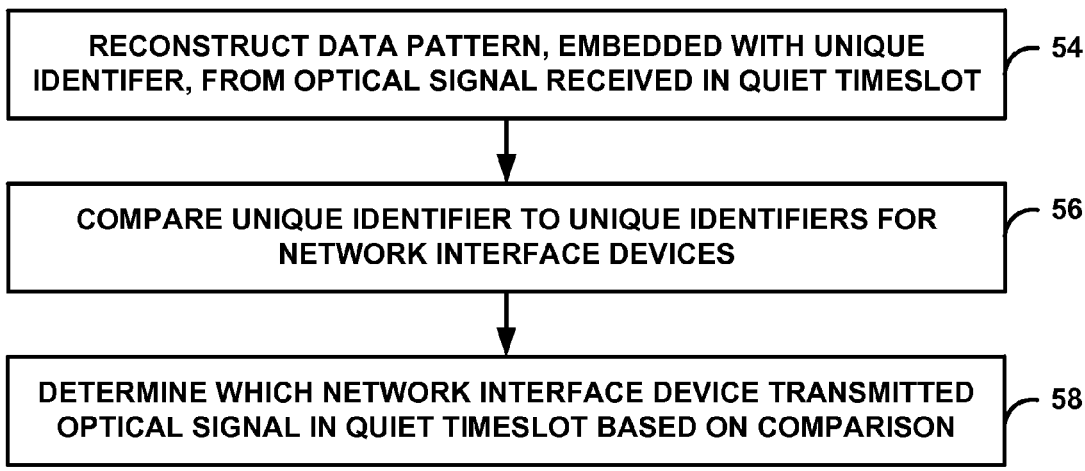
FIG. 5 is a flowchart illustrating another example method of operation of an OLT in accordance with techniques described in this disclosure.

FIG. 5 is a flowchart illustrating another example method of operation of an OLT in accordance with techniques described in this disclosure. In this example, processor 44 may reconstruct a data pattern, which may include a unique identifier, from an optical signal received from one of a plurality of network interface devices 28 in a quiet timeslot (e.g., unassigned allocation), where none of network interface devices 28 are to transmit optical signals in the quiet timeslot (54). Processor 44 may compare the unique identifier to the unique identifiers stored in memory 46 for respective network interface devices (56). Processor 44 may determine which one of the network interface devices transmitted the optical signal during the quiet timeslot based on the comparison (i.e., based on a unique identifier match) to identify a rogue network interface device (58).

Figure 6:
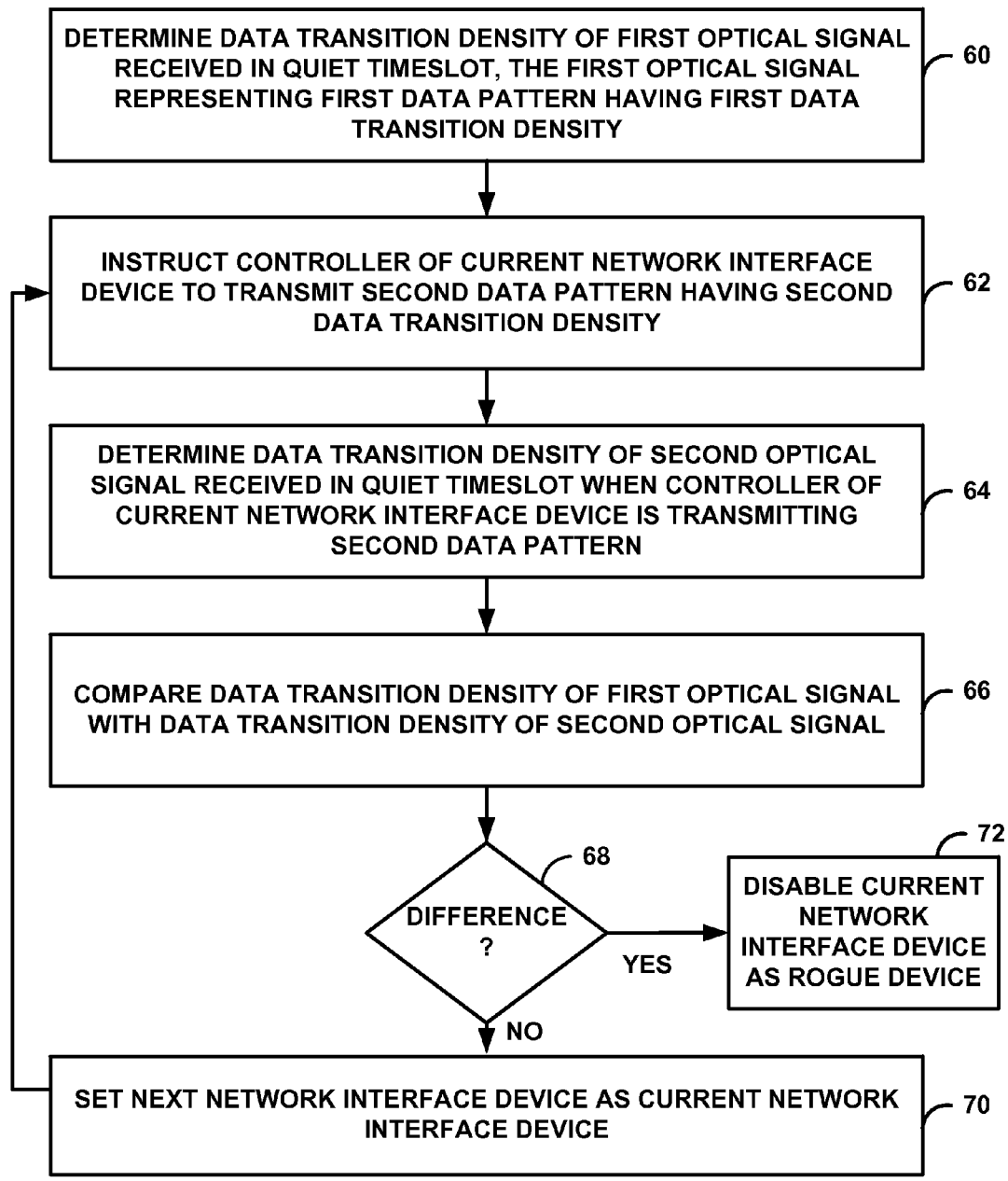
FIG. 6 is a flowchart illustrating another example method of operation of an OLT in accordance with techniques described in this disclosure.

FIG. 6 is a flowchart illustrating another example method of operation of an OLT in accordance with techniques described in this disclosure. In this example, processor 44 may determine a data transition density of a first optical signal received from one of a plurality of network interface devices 28 in a quiet timeslot (e.g., unassigned allocation), where none of the network interface devices are to transmit optical signals in the quiet timeslot, and where the first optical signal represents a first data pattern having a first data transition density (60). Processor 44 may instruct a controller of a current (e.g., first) network interface device to transmit a second data pattern having a second data transition density during timeslots to which the current (e.g., first) network interface device is not assigned (62).

Processor 44 may be configured to determine a data transition density of a second optical signal received in the quiet timeslot when the controller of the current (e.g., first) network interface device is transmitting the second data pattern having the second data transition density during timeslots to which the first network interface device is not assigned (64). Processor 44 may be configured to compare the determined data transition density of the first optical signal with the determined data transition density of the second optical signal (66).

Processor 44 may then determine whether there is a difference in the determined data transition density of the first optical signal with the determined data transition density of the second optical signal based on the comparison (68). If processor 44 determines that there is a difference (YES of 68), processor 44 may determine that the current network interface device is a rogue network interface device and disable the current network interface device (72). If processor 44 determines is no difference (NO of 68), processor 44 may determine that the current network interface device is not the rogue network interface device and set the next network interface device (e.g., second network interface device) as the current network interface device (70). Processor 44 may then repeat the above steps until processor 44 identifies and disables the rogue network interface device.

Figure 7:
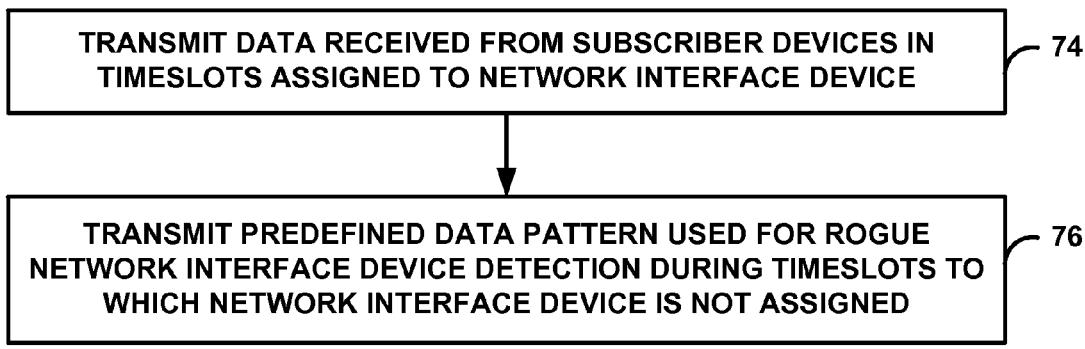
FIG. 7 is a flowchart illustrating an example method of operation of network interface device in accordance with techniques described in this disclosure.

FIG. 7 is a flowchart illustrating an example method of operation of network interface device in accordance with techniques described in this disclosure. In this example, controller 32 of network interface device 28A may be configured to cause laser driver 38 to transmit data received from one or more subscriber devices 30A in timeslots assigned to network interface device 28A (74). Controller 32 of network interface device 28A may be configured to cause laser driver 38 to transmit a predefined data pattern used for rogue network interface device identification during timeslots to which network interface device 28A is not assigned (76).

For example, to cause laser driver 38 to transmit the predefined data pattern, controller 32 may be configured to transmit a unique identifier of network interface device 28A. As another example, controller 32 may be configured to transmit a first predefined data pattern having a first data transition density during timeslots to which network interface device 28A is not assigned, and receive an instruction to switch from the first predefined data pattern to a second predefined data pattern having a second, different data transition density. In this example, to cause laser driver 38 to transmit the predefined data pattern, controller 32 may be configured to cause laser driver 38 to transmit the second predefined pattern during timeslots to which network interface device 38 is not assigned, in response to receiving the instruction to switch from the first predefined data pattern to the second predefined data pattern.

In examples where controller 32 causes laser driver 38 to transmit a unique identifier, subsequent to transmitting the unique identifier, controller 32 may receive instructions to transmit a first data pattern having a first data transition density during timeslots to which network interface device 28A is not assigned. Controller 32 may transmit the first data pattern having the first data transition density during timeslots to which network interface device 28A is not assigned. Subsequent to transmitting the first data pattern having the first data transition density, controller 32 may receive instructions to transmit a second data pattern having a second data transition density during timeslots to which network interface device 28A is not assigned. Controller 32 may transmit the second data pattern having the second transition density during timeslots to which network interface device 28A is not assigned.

Figure 8:
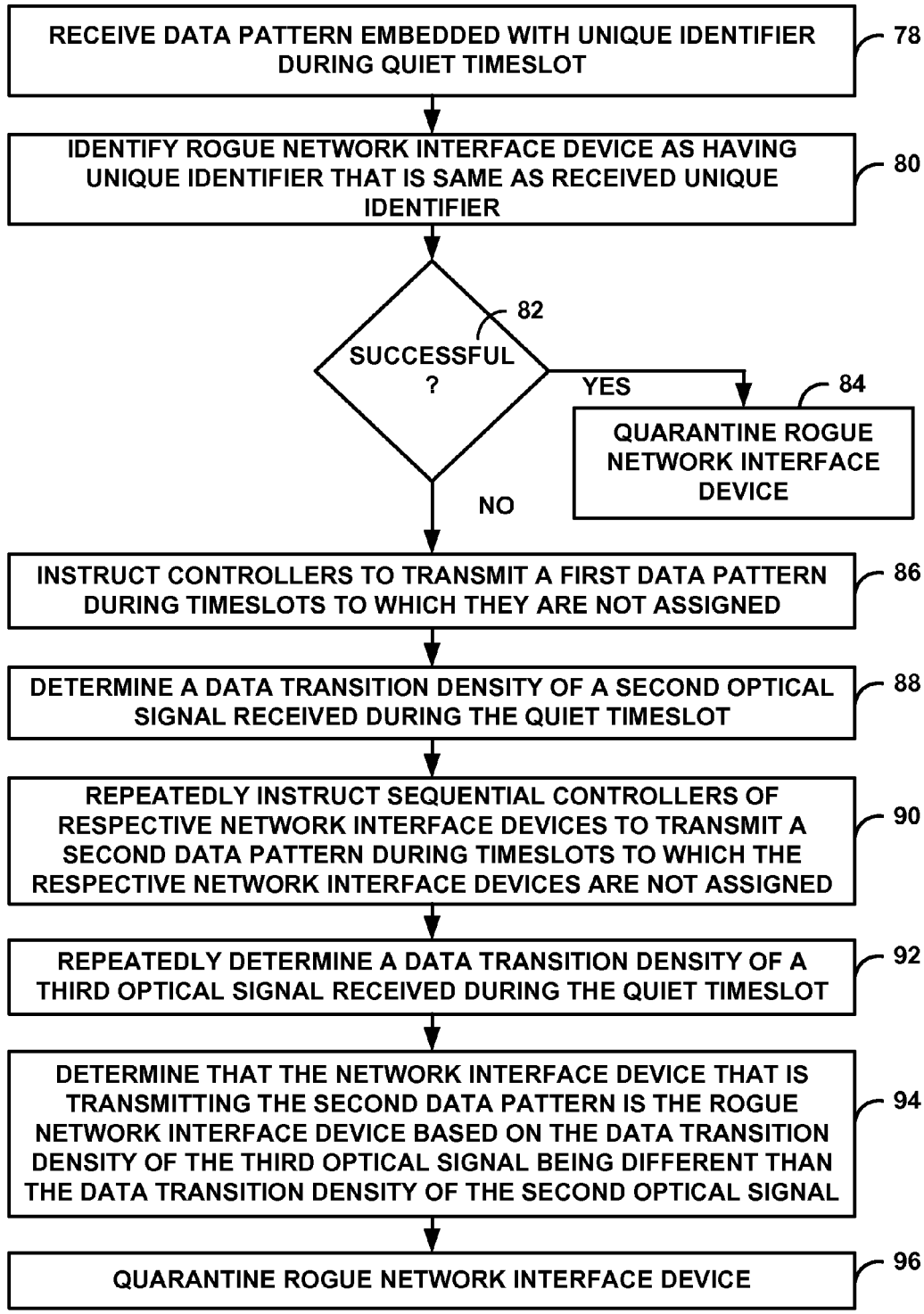
FIG. 8 is a flowchart illustrating another example method of operation of an OLT in accordance with techniques described in this disclosure.

FIG. 8 is a flowchart illustrating another example method of operation of an OLT in accordance with techniques described in this disclosure. As illustrated, OLT 12 may receive a data pattern, embedded with a unique identifier, from an optical signal received during a quiet timeslot, where the quiet timeslot is a timeslot that is not allocated to any of a plurality of network interface devices 28 for upstream transmission (e.g., none of network interface devices 28 is to transmit upstream data during the quiet timeslot) (78). In some examples, OLT 12 may first detect that one of the plurality of network interface devices 28 is transmitting during the quiet timeslot, and in response to detecting that one of the plurality of network interface devices 28 is transmitting during the quiet timeslot, OLT 12 may instruct respective controllers 32 of one or more of the plurality of network interface devices 28 to transmit respective unique identifiers during timeslots to which the respective plurality of network interface devices 28 are not assigned. OLT 12 may then receive the data pattern, embedded with the unique identifier, from the optical signal received during the quiet timeslot.

OLT 12 may identify a rogue network interface from the plurality of network interface devices 28 as one of the network interface devices having a unique identifier that is same as the unique identifier embedded in the data pattern received during the quiet timeslot (80). For example, OLT 12 may store the unique identifiers for each of the plurality of network interface devices 28. OLT 12 may compare the embedded unique identifier in the received data pattern with respective unique identifiers of one or more of network interface devices 28. In this example, OLT 12 may identify the rogue network interface device based on the comparison.

In some examples, in identifying the rogue network interface device, OLT 12 may not need to disable the upstream transmission of network interface devices 28 during their respective assigned timeslots.

OLT 12 may determine whether identifying the rogue network interface device was successful (82). For instance, due to the design of the APC loop respective laser drivers 38 of respective network interface devices 28, it may be possible that OLT 12 cannot reconstruct the unique identifier for the rogue network interface device, and therefore, may not be able to identify the rogue network interface device.

If OLT 12 determines that identifying the rogue network interface device is successful (YES of 82), OLT 12 may output instructions to quarantine the rogue network interface device (84). For example, OLT 12 may output instructions that instruct controller 32 of the rogue network interface device to disable power to one or both of laser driver 38 of the rogue network interface device or laser 40 of the rogue network interface device. There may be other ways in which OLT 12 quarantines the rogue network interface device. Also, in some cases, when the rogue network interface device is quarantined, the rogue network interface device may still receive downstream data.

If OLT 12 determines that identifying the rogue network interface device is not successful (NO of 82), OLT 12 may instruct controllers 32 of network interface devices 28 to transmit a first data pattern having a first data transition density during timeslots to which network interface devices 28 are not assigned (86). OLT 12 may then determine a data transition density of a second optical signal received during the quiet timeslot (88).

Next, OLT 12 may repeatedly instruct controllers 32 of respective network interface devices 28 to sequentially transmit a second data pattern having a second data transition density during timeslots to which the respective network interface devices 28 are not assigned until the rogue network interface device is identified (90). OLT 12 may also repeatedly determine a data transition density of a third optical signal received during the quiet timeslot until the rogue network interface device is identified (92). Based on the data transition density of the third optical signal being different than the data transition density of the second optical signal, OLT 12 may determine that the network interface device that is transmitting the second data pattern having the second data transition density is the rogue network interface device (94). Once the rogue network interface device is identified, OLT 12 may output instructions to quarantine the rogue network interface device (96).

Figure 9:
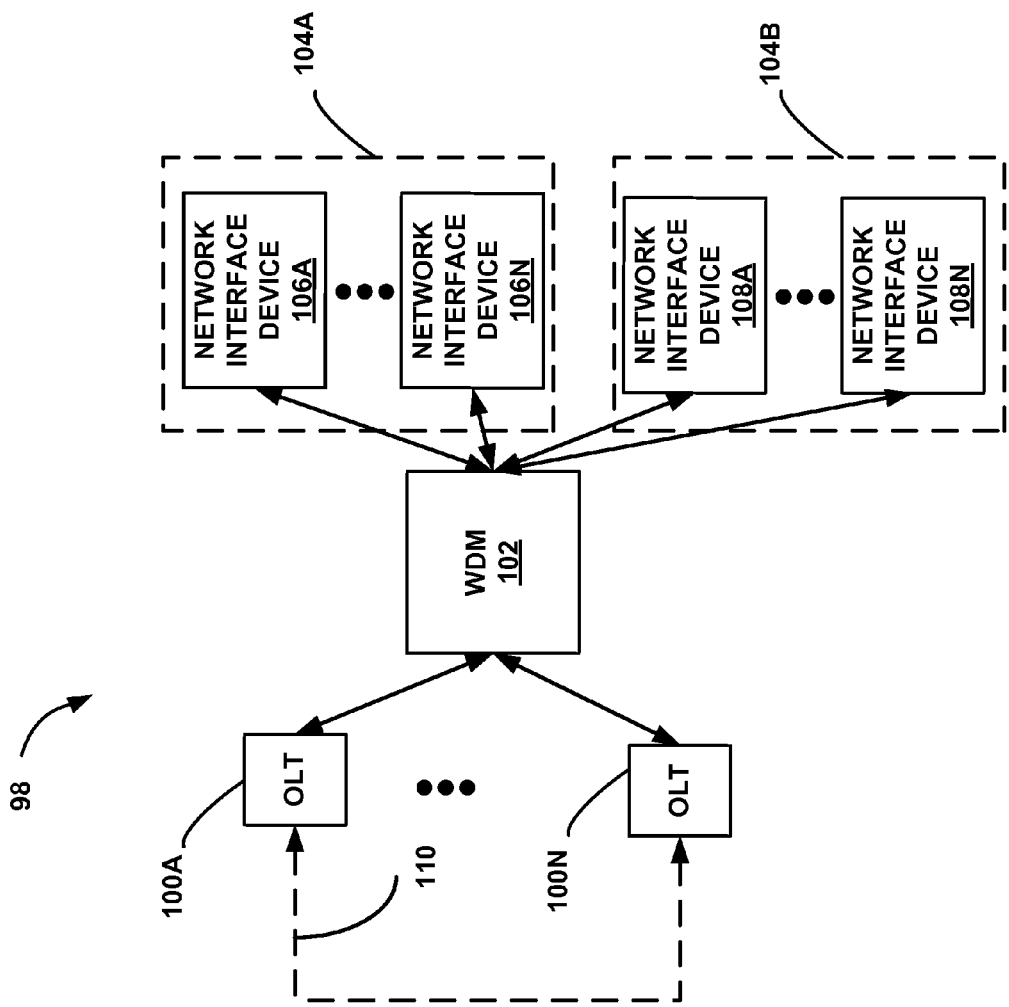
FIG. 9 is a block diagram illustrating another network, in accordance with one or more aspects of this disclosure.

FIG. 9 is a block diagram illustrating another network, in accordance with one or more aspects of this disclosure. For example, FIG. 9 illustrates a multiple wavelength system 98. One example of system 98 is an ITU-T G.989 (NGPON-2) conforming system. System 98 includes OLTs 100A-100N, which may each be similar to OLT 12 of FIG. 1. For ease of illustration, the various components that couple to OLTs 100 for voice, data, and video, illustrated in FIG. 1, are not illustrated in FIG. 9.

In system 98, each one of OLTs 100A-100N may transmit downstream optical signals and receive upstream optical signals at specific wavelengths that are different from one another. For example, OLT 100A transmits optical signals at a first downstream wavelength, and receives optical signals at a first upstream wavelength. OLT 100N transmits optical signals at a second downstream wavelength, and receives optical signals at a second upstream wavelength. Each of these downstream wavelengths is different than each of the other downstream wavelengths and each of the upstream wavelengths. Each of these upstream wavelengths is different than each of the other upstream wavelengths and each of the downstream wavelengths.

In some examples, OLTs 100A-100N may not all be the product of the same company. In some examples, OLTs 100A-100N may be located in different geographical locations. In some examples, OLTs 100A-100N may be located together within the same chassis or located together within proximity of one another. In some examples, rather than having multiple OLTs 100A-100N, system 98 may include one OLT with multiple transmitters and receivers where each transmitter is configured to transmit downstream optical signals at different downstream wavelengths, and each receiver is configured to receive upstream optical signals at different upstream wavelengths (where the downstream and upstream wavelengths are also different). For ease of description, the techniques are described with examples that include multiple OLTs (e.g., OLTs 100A-100N).

Each one of OLTs 100A-100N is associated with (e.g., assigned to) a set of network interface devices. For example, OLT 100A is associated with set of network interface devices 104A, and OLT 100N is associated with set of network interface devices 104B. Set of network interface devices 104A includes network interface devices 106A-106N, and set of network interface devices 104B includes network interface devices 108A-108N.

Network interface devices 106A-106N and 108A-108N may be similar to network interface devices 28. For ease of illustration and description, the subscriber devices that connect to respective network interface devices 106A-106N and 108A-108N are not illustrated in FIG. 9.

In some examples, the upstream and downstream capabilities of network interface devices 104A-104N and 106A-106N may be tunable. For instance, as described above, OLT 100A may be configured to transmit downstream optical signals with a first downstream wavelength and configured to receive upstream optical signals with a first upstream wavelength. In the example of FIG. 9, network interface devices 106 may be tuned to transmit optical signals at the first upstream wavelength and receive optical signals at the first downstream wavelength. Similarly, network interface devices 108 may be tuned to transmit optical signals at the second upstream wavelength at which OLT 100N is configured to receive optical signals, and tuned to receive optical signals at the second downstream wavelength at which OLT 100N is configured to transmit optical signals.

In some examples, network interface devices 106 and 108 may be tunable for distinct wavelengths. For instance, network interface devices 106 and 108 may be tunable to transmit upstream optical signals with wavelength X or with wavelength Y, and not wavelengths intermediate to X and Y, or wavelengths other than X or Y. In this example, OLT 100A may be configured to receive upstream optical signals with wavelength X, and OLT 100B may be configured to receive upstream optical signals with wavelength Y. The same may be true for the tuning for the reception of downstream optical signals.

As illustrated, system 98 includes wave division multiplexer (WDM) 102. In the downstream, WDM 102 receives downstream optical signals at respective wavelengths from OLTs 100A-100N, and filters the downstream optical signals so that network interface devices 106 only receive the downstream optical signals with the first downstream wavelength, and so that network interface devices 108 only receive the downstream optical signals with the second downstream wavelength. In the upstream, WDM 102 receives upstream optical signals at respective wavelengths from network interface devices 106 and network interface devices 108, and filters the upstream optical signals so that OLT 100A only receives the optical signals with first upstream wavelength, and so that OLT 100N only receives the optical signals with the second upstream wavelength.

Although a single WDM 102 is illustrated in FIG. 9, in some examples there may be multiple WDMs located throughout system 98. As one example, a first WDM may couple to OLTs 100A-100N, and couple to a second WDM via a first fiber link and a third WDM via a second fiber link. The second WDM may be proximate to network interface devices 106, and the third WDM may be proximate to network interface devices 108. Other such configurations are possible to allow OLTs 100A-100N to communicate with network interface devices 106A-106N and 108A-108N.

In some examples, if network interface device 106A becomes rogue (e.g., transmits upstream optical signals during one or more timeslots to which it is not assigned), OLT 100A may be able to determine that network interface device 106A is rogue using the above example techniques if network interface device 106A is still transmitting upstream optical signals at the first upstream wavelength. However, in some cases, it may be possible for network interface device 106A to become rogue and to transmit upstream optical signals not at the first upstream wavelength, but at a different upstream wavelength (e.g., the second upstream wavelength). In this example, OLT 100A may not be able to determine that network interface device 106A is rogue because OLT 100A would not receive an optical signal in the quiet timeslot of OLT 100A (again, network interface device 106A is rogue and not transmitting optical signals at the wavelength that OLT 100A is configured to receive, which is why OLT 100A does not receive the optical signal in the quiet timeslot although network interface device 106A is rogue). For instance, because network interface device 106A is transmitting an optical signal with a wavelength that OLT 100A is does not receive, WDM 102 may not route the optical signal from network interface device 106A to OLT 100A.

For instance, assume that rather than transmitting optical signals with the first upstream wavelength, network interface device 106A transmits optical signals with second upstream wavelength. In this example, WDM 102 may route the optical signals from network interface 106A to OLT 100N. In this case, OLT 100N may detect an optical signal in the quiet timeslot of OLT 100N. However, because network interface device 106A belongs to set of network interfaces 104A, OLT 100N may not be able to control network interface device 104A, making it difficult for OLT 100N to determine which network interface device is rogue.

For example, OLTs 100A-100N and network interface devices 106 and 108 may be configured to implement the "self-identifying background patterns technique" and/or the "differential pattern transition technique" described above. However, if network interface device 106A is rogue and transmitting an optical signal at the wavelength that OLT 100A does not receive (e.g., is filtered out by WDM 102), it may be difficult to implement the self-identifying background patterns technique and/or the differential pattern transition technique, and difficult to quarantine the rogue network interface device. Although network interface device 106A is described as being the rogue network interface device, it should be understood that the techniques are equally applicable to any one of network interface devices 106 or 108 being rogue.

In the example illustrated in FIG. 9, in accordance with the self-identifying background pattern, network interface device 106A may transmit its unique identifier during one or more timeslots to which it is not assigned and perform such transmission with an optical signal with the second upstream wavelength, rather than the first upstream wavelength. WDM 102 may forward the transmission from network interface device 106A to OLT 100N. OLT 100N may reconstruct the unique identifier for network interface device 106A.

In some examples, OLT 100N may store a lookup table with the unique identifiers for all network interface devices 106 and 108 associated with each of OLTs 100 in system 98, even though network interface devices 106 are not associated with OLT 100N. From the lookup table, OLT 100N may determine that network interface device 106A is rogue. However, because OLT 100N cannot transmit downstream information to network interface device 106A, OLT 100N may not be able to disable (e.g., quarantine) network interface device 106A.

For instance, OLT 100N is configured to transmit downstream optical signals at the second downstream wavelength. In this case, WDM 102 may forward downstream optical signals with the second downstream wavelength to set of network interface devices 104B (e.g., network interface devices 108). Therefore, network interface device 106A may not receive the disable instruction from OLT 100N to remove power from its laser driver or laser.

In this sense, OLT 100N may be considered as a detector OLT because OLT 100N is configured to detect and determine which network interface device is rogue. However, OLT 100N cannot control the rogue network interface device, and a controller OLT may be needed to control the rogue network interface device.

As one example, in addition to storing the unique identifiers for each one of network interface devices 106 and 108, OLT 100N may also store information indicating with which OLT each one of network interface devices 104 is associated. OLT 100N may store such information in the same list as the list of unique identifiers or in a separate list.

OLT 100N may determine that OLT 100A is associated with network interface device 106A. OLT 100A may be considered as the controller OLT because OLT 100A can control network interface device 106A.

OLT 100N may transmit a request OLT 100A to disable (e.g., quarantine) network interface device 106A. In response, OLT 100A may disable network interface device 106A. OLT 100N may transmit the request to OLT 100A using any of a variety of transmission protocols, including out of band communication, as illustrated by dashed line 110.

In some examples, OLT 100N may not store a look up table of the unique identifiers for all network interface devices 106 and 108 or information that identifies which OLTs are associated with which network interface devices. In these examples, in accordance with the self-identifying background patterns technique, OLT 100N may reconstruct the unique identifier of network interface device 106A and determine that OLT 100N is not associated with network interface device 106A. Then, OLT 100N may broadcast the unique identifier for network interface device 106A to one or more other OLTs and send a request (e.g., via out of band communication 110) to all other OLTs requesting the OLT that controls network interface device 106A to disable (e.g., quarantine) network interface device 106A. In this example, because OLT 100A is the controller OLT of network interface device 106A, in response to request from OLT 100N, OLT 100A may disable network interface device 106A.

In this manner, by utilizing a detector OLT and a controller OLT (e.g., the detector OLT communicates with the controller OLT), the self-identifying background patterns technique may be extended to a multiple wavelength system such as system 98. In the techniques described in this disclosure, by utilizing a detector OLT and a controller OLT, the different pattern transition technique may also be extend to a multiple wavelength system such as system 98.

For instance, the following keeps with the example where network interface device 106A is the rouge network interface device (e.g., transmitting at one or more timeslots to which it is not assigned outside of the control of its controller OLT) that is transmitting optical signals at the second upstream wavelength. As above, OLT 100N may receive an optical signal in the quiet timeslot of OLT 100N.

However, in this example, there is no unique identifier, and therefore, OLT 100N may not be able to determine whether the rogue network interface device exists in set of network interface devices 104A or set of network interface devices 104B. In some examples, OLT 100N may implement the differential pattern transition technique on network interface devices 108 of set of network interface devices 104B, as described above. In this case, there may be no difficulty for OLT 100N to implement the differential pattern transition technique on network interface devices 108 because network interface devices 108 are associated with OLT 100N.

However, by implementing the differential pattern transition technique on network interface devices 108, OLT 100N may not identify the rogue network interface device (e.g., network interface device 106A) because the rogue network interface is not one of network interface devices 108. Also, because OLT 100N may not be configured to control network interface devices 106, OLT 100N may not be capable of causing the controllers of network interface devices 106 to switch data patterns from the first predefined data pattern with a first data transition density to the second predefined data pattern with a second data transition density.

For the differential pattern transition technique, the controllers of network interface devices 106 and 108 may be configured to transmit the first predefined pattern with the first data transition density during one or more timeslots to which they are not assigned. If the controllers of network interface devices 106 and 108 are not already transmitting the first predefined data pattern with the first data transition density during one or more timeslots to which they are not assigned, the detector OLT (e.g., OLT 100N) may request all OLTs 100 to instruct the controllers of the network interface devices with which they are associated to transmit the first predefined pattern with the first data transition density during one or more timeslots to which they are not assigned. In either example, the detector OLT (e.g., OLT 100N) may determine the data transition density of the optical signal received during the quiet timeslot.

OLT 100N may then request a first OLT to instruct a controller of a first network interface device that is associated with the first OLT to switch from the first predefined data pattern with the first transition density to the second predefined data pattern with the second transition density. In this example, the first OLT is the controller OLT because the first OLT controls the first network interface device associated with the first OLT.

OLT 100N may then determine whether the transition density of the optical signal received in the quiet timeslot changed. If the transition density changed, OLT 100N may request the first OLT to disable the first network interface device because OLT 100N determined that the first network interface device of the first OLT is rogue.

If the transition density did not change, OLT 100N may request the first OLT to instruct the controller of the second network interface device to switch from the first predefined pattern with the first data transition density to the second predefined pattern with the second data transition density. OLT 100N may determine whether the transition density changed, and if the transition density did not change, and may repeat the above steps until all network interface devices associated with the first OLT have been checked. If OLT 100N is still not able identify the rogue network interface device, OLT 100N may proceed with the next OLT and repeat the steps until OLT 100N identifies the rogue network interface device, which is then disabled.

In the above example of the differential pattern transition technique, the detector OLT (e.g., OLT 100N) dictates to the controller OLT when to switch from the first predefined pattern with the first data transition density to the second predefined pattern with the second data transition density. However, the techniques described in this disclosure are not so limited. In some examples, the detector OLT may broadcast that a rogue network interface device exists. Then, based on some predefined criteria or negotiation between OLTs 100, one of the other OLTs (e.g., other than OLT 100N) may be the first to implement the differential pattern transition technique.

For instance, assume that an OLT (i.e., OLT 100B) (not shown in FIG. 9), is determined to implement the differential pattern transition technique first, followed by OLT 100A. In this example, OLT 100B may instruct a first network interface device associated with OLT 100B to switch from the first predefined pattern with the first data transition density to the second predefined pattern with the second data transition density. OLT 100B may then query OLT 100N about whether the transition density in the quiet timeslot of OLT 100N changed. If OLT 100N responds that there is no change in the transition density, then OLT 100B may instruct a second network interface device associated with OLT 100B to switch from the first predefined pattern with the first data transition density to the second predefined data pattern with the second data transition density, and query OLT 100N about any change in the transition density.

OLT 100B may keep repeating these steps until either the rogue network interface device is identified or until all network interface devices associated with OLT 100B have been checked. In this example, because network interface device 106A is rogue, the differential pattern transition technique, being implemented by OLT 100B, may not identify the rogue network interface device.

However, OLT 100A may then implement the differential pattern transition technique. In this example OLT 100A may instruct network interface device 106A to switch from the first predefined data pattern with the first data transition density to the second predefined data pattern with the second data transition density. OLT 100A may then query OLT 100N, and OLT 100N may indicate that the transition density of the optical signal received in the quiet timeslot indeed changed. OLT 100A may determine that network interface device 106A is the rogue network interface device and disable network interface device 106A.

In this manner, it may be possible to identify the rogue network interface device in the multiple wavelength system. For example, the detector OLT (e.g., OLT 100N) may receive a data pattern in an optical signal received from one of a plurality of network interface devices with which the detector OLT is not configured to communicate (e.g., network interface device 106A) in a quiet timeslot. The detector OLT may communicate with one or more other OLTs (e.g., one or more controller OLTs such as OLT 100A) for determining which one of the network interface devices transmitted the optical signal during the quiet timeslot based on the data pattern to identify a rogue network interface device. As one example, OLT 100N may transmit the identifier to OLT 100A for network interface device 106A.

As another example, OLT 100N may instruct all other OLTs to cause respective controllers to transmit a signal with a first data transition density during one or more timeslots to which they are not assigned. OLT 100N may then communicate with OLT 100A (e.g., instruct OLT 100A) to cause a controller of network interface device 106A to switch to a predefined pattern with a second data transition density. If OLT 100N determines that there is a change in the data transition density of the optical signal received during the quite timeslot, OLT 100N may determine that network interface device 106A is rogue and communicate with OLT 100A (e.g., instruct OLT 100A) to disable network interface device 106A.

Accordingly, in the example illustrated in FIG. 9, OLT 100N may include a memory, similar to memory 46 illustrated in FIG. 3, and one or more processors, similar to processor 44 illustrated in FIG. 3. The memory of OLT 100N stores information, and the one or more processors of OLT 100N are configured to receive a data pattern in an optical signal received during a quiet timeslot, where the quiet timeslot is a timeslot that is not allocated to any of a plurality of network interface devices (e.g., network interface devices 106), with which OLT 100N is associated, for upstream transmission.

The one or more processors may determine that a rogue network interface device from which the optical signal is received during the quiet timeslot is not a network interface device to which OLT 100N is configured to transmit downstream data based on the received data pattern and the stored information. For example, OLT 100N may store information that includes one or more lists of unique identifiers for all network interface devices associated with each one of OLTs 100, and based on the one or more lists determine that OLT 100N is not associated with the rogue network interface device, and determine which OLT is associated with the rogue network interface device. As another example, OLT 100N may store information that includes a list of unique identifiers only for the network interface devices associated with OLT 100N (e.g., network interface devices 108), and based on the list, OLT 100N determines that OLT 100N is not associated with the rogue network interface device.

OLT 100N may communicate with one or more of the other OLTs 100 information to quarantine the rogue network interface device. For instance, in the example where OLT 100N stores the identifiers for a plurality of network interface devices, and information identifying the OLTs to which a plurality of network interface devices are associated (e.g., all network interface devices, but does not have to be all network interface devices), OLT 100N may determine which OLT is associated with rogue network interface device, and instruct that OLT to quarantine the rogue network interface device. In the example where OLT 100N stores the identifiers for only the network interface device to which it is associated, OLT 100N may broadcast the identifier for the rogue interface device, and the OLT that is associated with the rogue interface device may quarantine the rogue interface device.

Figure 10:
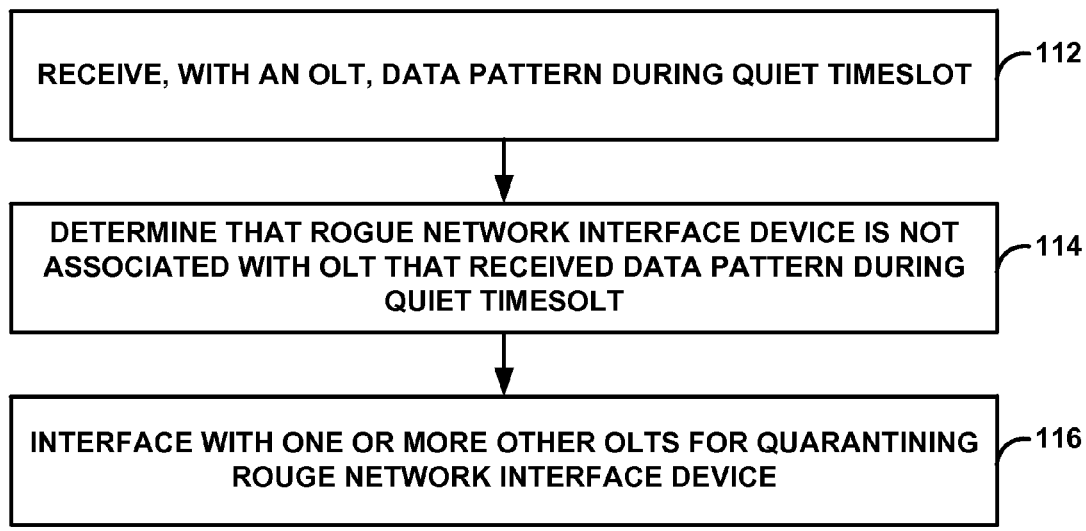
FIG. 10 is a flowchart illustrating an example method of operation of an OLT in the network illustrated in FIG. 9.

FIG. 10 is a flowchart illustrating an example method of operation of an OLT in the network illustrated in FIG. 9. In the example illustrated in FIG. 10, and as described above with respect to FIG. 9, system 98 includes a first OLT (e.g., OLT 100N), a set of network interface devices 104B associated with the first OLT, and a second OLT (e.g., OLT 100A). The first OLT may receive a data pattern in an optical signal received during a quiet timeslot, where the quiet timeslot is a timeslot that is not allocated to any of set of interface devices 104B (e.g., any of network interface devices 108), that are associated with the first OLT, for upstream transmission (112).

The first OLT may determine that a rogue network interface device from which the optical signal is received during the quiet timeslot is not a network interface device of the set of network interface devices 104B based on the received data pattern (114). For example, the first OLT may determine based on one or more stored lists that include the identifiers for one or more network interface devices 106 and 108 and the OLTs to which one or more network interface devices 106 and 108 are associated that the rogue network interface device is not associated with the first OLT. For instance, the first OLT may store a list of unique identifiers for network interface devices 106 and 108 and a list of OLTs to which network interface devices 106 and 108 are associated.

As another example, the first OLT may determine based on a stored list that include the identifiers only for one or more network interface devices 108 that the rogue network interface device is not associated with the first OLT. For instance, the first OLT may store a list of unique identifiers only for network interface devices 108.

The first OLT may communicate with one or more other OLTs (e.g., the second OLT) information to quarantine the rogue network interface device (116). For instance, the first OLT may determine that the second OLT is associated with the rogue network interface device based on the stored one or more lists and instruct the second OLT to quarantine the rogue network interface device. As another example, the first OLT may broadcast the identifier for the rogue network interface device, and the OLT that is associated with the rogue network interface device may quarantine the rogue network interface device.

Figure 11:
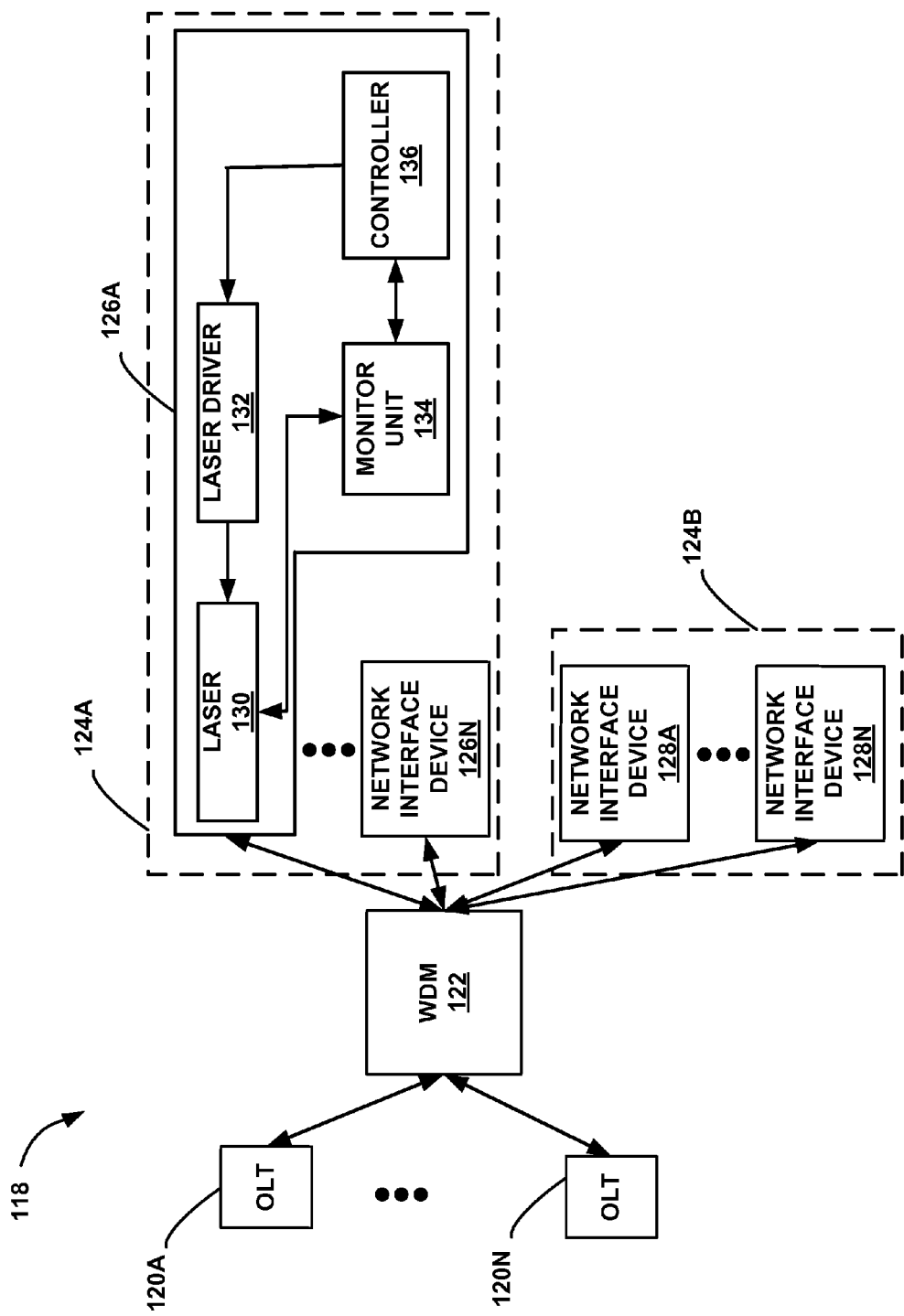
FIG. 11 is a block diagram illustrating another network, in accordance with one or more aspects of this disclosure.

FIG. 11 is a block diagram illustrating another network, in accordance with one or more aspects of this disclosure. Like FIG. 9, FIG. 11 also illustrates an example of multiple wavelength system, referred to as multiple wavelength system 118. The techniques described in the system illustrated in FIG. 11 may be function in conjunction with the example systems illustrated in FIGS. 1 and 9, or may function independently of the example systems illustrated in FIGS. 1 and 9. For instance, FIG. 11 illustrates an example in which each network interface device determines whether it is transmitting an optical signal at a wavelength at which it is not to transmit and self-quarantines.

As illustrated in FIG. 11, system 118 includes OLTs 120A-120N, WDM 122, a first set of network interface devices 124A that includes network interface devices 126A-126N, and a second set of network interface devices 124B that includes network interface devices 128A-128N. For ease of description, the subscriber devices, as illustrated in FIG. 1, coupled to each of network interface devices 126 and 128 are not illustrated in FIG. 11. Also for ease of description, the various components that couple to OLTs 120 for voice, data, and video, illustrated in FIG. 1, are not illustrated in FIG. 11.

Similar to FIG. 9, each one of OLTs 120 may transmit downstream optical signal and receive upstream optical signals from different sets of network interface devices 124. For example, OLT 120A may transmit and receive optical signals from network interface devices 126 of set 124A, and OLT 120N may transmit and receive optical signals from network interface devices 128 of set 124B. Accordingly, each of OLTs 120 may transmit and receive optical signals at different wavelengths, and network interface devices 126 of set 124A may transmit and receive optical signals at different wavelengths than network interface devices 128 of set 124B. WDM 122 may transmit optical signals to the right pair of OLTs 120 and sets 124. Also, although not illustrated in FIG. 11, in some cases, OLTs 120 may communicate with one another using out of band communication, such as via out of band communication 110 illustrated in FIG. 9.

In examples described above with respect to FIGS. 1-10, one way in which a network interface device becomes rogue is by transmitting an optical signal during timeslots to which it is not assigned. The above example techniques describe ways in which an OLT (e.g., OLT 12 or one of OLTs 100) determines which network interface device (e.g., which one of network interface devices 28 or which one of network interface devices 106 or 108) is rogue. In some instances it may be possible for the network interface device itself to determine whether it is rogue.

For example, as illustrated in FIG. 11, network interface device 126A includes laser 130, laser driver 132, monitor unit 134, and controller 136. Network interface devices 126B-126N and 128 may include similar components. Laser 130, laser driver 132, and controller 136 may be substantially similar to laser 40, laser driver 38, and controller 32 of network interface device 28A illustrated in FIG. 2. Furthermore, although the components of network interface device 126A for transmitting an optical signal are illustrated in FIG. 11, network interface device 126A also includes components for receiving optical signals, such as a photodiode, a transimpedance amplifier (TIA), limiting amplifier, and a clock-and-data recovery (CDR) unit. The components used for receiving optical signals are not illustrated for ease.

Monitor unit 134, sometimes referred to as a "watchdog," may be integrated with controller 136 or external to controller 136. Monitor unit 134 may be implemented as hardware or software or firmware executing on hardware. Monitor unit 134 may monitor the optical output power level of laser 130 (e.g., the average optical power level), and output a value indicative of the optical output power level to controller 136. Monitor unit 134 may continuously monitor the optical output power level of laser 130, or periodically monitor the optical output power level of laser 130. In some examples, controller 136 may instruct monitor unit 134 to monitor the optical output power level of laser 130 during timeslots assigned to network interface device 126A for upstream transmission, and to monitor the optical output power level of laser 130 during timeslots not assigned to network interface device 126A for upstream transmission.

If monitor unit 134 outputs an optical output power level value that is greater than a threshold during timeslots that are assigned to network interface device 126A, and outputs an optical output power level value that is less than a threshold during timeslots that are not assigned to network interface device 126A, controller 136 may determine that network interface device 126A is operating properly. However, if monitor unit 134 outputs an optical output power level value that is greater than a threshold during timeslots that are assigned to network interface device 126A, but outputs an optical output power level value that is also greater than a threshold during timeslots that are not assigned to network interface device 126A, controller 136 may determine that network interface device 126A is rogue. In this case, controller 136 may quarantine network interface device 126A (e.g., disable upstream transmission of optical signals).

The techniques where controller 136 quarantines network interface device 126A based on the monitoring of the optical power level outputted by laser 130 may be referred to as a self-quarantining technique. Also, although this self-quarantining technique is described with respect to the multiple wavelength system, such techniques may be applied to non-multiple wavelength systems, such as the system illustrated in FIG. 1. For instance, this example of the self-quarantining technique does not require an instruction from an OLT for quarantining purposes. However, self-quarantining may utilize additional components such as monitor unit 134 and require monitoring of the laser output, which may not be needed in the examples illustrated in FIGS. 1 and 9.

Furthermore, in accordance with aspects described in this disclosure, the self-quarantining technique may be utilized for situations where a network interface device becomes a "wavelength rogue." As described above, in some examples, a network interface device becomes rogue by transmitting optical signals during timeslots to which it is not assigned. However, in multiple wavelength systems, a network interface device may be transmitting optical signals at assigned timeslots, and not transmitting optical signals at timeslots to which it is not assigned, but may be transmitting optical signals at the incorrect wavelength.

For instance, in the example described with respect to FIG. 9, network interface device 106A transmits optical signals during timeslots to which it is not assigned, and also transmits optical signals at a wavelength to which it is not assigned. In some cases, it may be possible for network interface device 126A to not transmit optical signals during timeslots to which it is not assigned, but may transmit optical signals, at correct timeslots, at a wavelength to which it is not assigned. If network interface device 126A does not transmit optical signals during timeslots to which it is not assigned, but transmits optical signals, at correct timeslots, at a wavelength to which it is not assigned, network interface device 126A may be considered as being wavelength rogue network interface device.

As an illustrative example, assume that network interface device 126A is assigned to OLT 120A. In this example, under normal operation, OLT 120A transmits downstream optical signals that network interface device 126A receives, and network interface device 126A transmit optical signals at a first wavelength that OLT 120A is configured to receive. However, it may be possible for laser 130 of network interface device 126A to drift, causing network interface device 126A to transmit optical signals at a second wavelength. Assume that OLT 120N is configured to receive optical signals at the second wavelength from network interface devices 128. In this example, OLT 120N may receive optical signals from network interface device 126A, which is a network interface device not assigned to OLT 120N.

In this example, because network interface device 126A is not transmitting optical signals during timeslots to which it is not assigned, it may be possible that OLT 120N does not receive any optical signal during its quiet timeslot. For instance, if the timeslot that network interface device 126A is assigned overlaps with one or more timeslots that one or more of network interface devices 128 is assigned, then OLT 120N may not receive optical signals during the quiet timeslot of OLT 120N because network interface device 126A is only transmitting optical signals during timeslots to which it is assigned.

In this case, although OLT 120N may not be able to correctly determine the digital bits transmitted by one or more network interface devices 128 due to the interference from the optical signal transmitted by network interface device 126A, OLT 120N may not be able to determine that a wavelength rogue network interface device exists in system 118 because there is no optical signal in the quite timeslot of OLT 120N. Furthermore, it may be possible that laser 130 outputs at a wavelength that none of OLTs 120 are configured to receive, and therefore, would not be able to determine that a wavelength rogue network interface device exists in system 118 even if the wavelength rogue network interface device transmits optical signals at timeslots to which it is not assigned.

In accordance with techniques described in this disclosure, one or more of network interface devices 126 and 128 may be configured to implement the self-quarantining technique, and as described in more detail, may be able to self-quarantine when transmitting at a wavelength that the OLT to which network interface devices 126 and 128 are assigned does not receive. In this manner, even in instances where one of network interface devices 126 or 128 is a wavelength rogue network interface device, it may be possible to quarantine such a wavelength rogue network interface device.

Again, a wavelength rogue network interface device may still receive downstream optical signals, but may be transmitting upstream optical signals at an incorrect wavelength. The self-quarantine techniques described in this disclosure may allow a wavelength rogue network interface device to self-quarantine (e.g., disable upstream transmission) without necessarily affecting reception of downstream optical signals.

In accordance with some aspects of this disclosure, each one of OLTs 120 may determine whether any optical signal was received during timeslots assigned to respective ones of network interface devices 126 and 128. For example, assume that OLT 120A assigned a first timeslot to network interface device 126A, a second timeslot to network interface device 126B, and so forth. OLT 120A may determine if OLT 120A received optical signal during the first timeslot, determine if OLT 120A received optical signal during the second timeslot, and so forth.

In this example, if OLT 120A does not receive optical signal from a particular one of network interface devices 126 during its assigned timeslot, OLT 120A may output information requesting that one of network interface device 126 to determine whether it is transmitting during its assigned timeslot. For example, assume that network interface device 126A did not transmit an optical signal during the first timeslot. In this case, OLT 120A may output a downstream signal requesting network interface device 126A to determine whether laser 130 transmitted an optical signal during a timeslot assigned to network interface device 126A.

In response, controller 136 may determine whether network interface device 126A is transmitting optical signals during a timeslot assigned to network interface device 126A. For example, controller 136 may be configured with information indicating the timeslot when network interface device 126A should transmit upstream, and may also determine whether network interface device 126A is to transmit upstream during a particular timeslot. For example, if there is no information from the subscriber devices coupled to network interface device 126A for upstream transmission, then controller 136 may determine that no upstream information should be transmitted during a timeslot. Conversely, if there is information from the subscriber devices coupled to network interface device 126A for upstream transmission, then controller 136 may determine that upstream information should be transmitted during a timeslot.

Controller 136 may instruct monitor unit 134 to determine whether laser 130 outputted an optical signal during a timeslot assigned to network interface device 126A. If controller 136 determines that laser 130 transmitted an optical signal during a timeslot assigned to network interface device 126A, and controller 136 still received an instruction to determine whether network interface device 126A transmitted an optical signal during its assigned timeslot, controller 136 may determine that laser 130 is not transmitting at the wavelength that OLT 120A is configured to receive. Controller 136 may determine that network interface device 126A is a wavelength rogue network interface device and self-quarantine by disabling laser 130 from transmitting optical signals.

For instance, because controller 136 determined that laser 130 transmitted an optical signal at an assigned timeslot, as indicated by the optical power level value from monitor unit 134, but OLT 120A requested controller 136 to determine whether network interface device 126A transmitted an optical signal during an assigned timeslot, controller 136 may determine that OLT 120A did not receive an optical signal during the assigned timeslot because laser 130 is transmitting at a wavelength that OLT 120A does not receive. In this case, controller 136 may quarantine network interface device 126A.

For a self-quarantined network interface device, such a quarantined network interface device may be considered as a missing network interface device from the perspective of the OLT that is transmitting downstream signals to the network interface device. For example, if network interface device 126A self-quarantines itself and OLT 120A does not receive information from network interface device 126A after OLT 120A sends an instruction that OLT 120A did not receive upstream communication from network interface device 126A, OLT 120A may consider network interface device 126A to be a missing network interface device and not transmit additional instructions indicating that OLT 120A did not receive information from network interface device 126A.

In some examples, controller 136 may store information indicating whether laser 130 transmitted an optical signal during an assigned timeslot. In these examples, if controller 136 receives a request from OLT 120A to determine whether network interface device 126A transmitted an optical signal during the assigned timeslot, controller 136 may determine whether or not laser 130 transmitted an optical signal during the assigned timeslot based on the stored information. If controller 136 determined that laser 130 did transmit an optical signal, then controller 136 may determine that OLT 120A did not receive the optical signal because network interface device 126A is a rogue network interface device. In some examples, for confirmation purposes, controller 136 may wait for multiple instances of OLT 120A requesting that network interface device 126A determine whether it is transmitting during its assigned timeslot before determining that network interface device 126A is wavelength rogue.

Rather than or in addition to storing information indicating whether laser 130 transmitted an optical signal during a timeslot assigned to network interface device 126A, controller 136 may wait until it receives a request to determine whether network interface device 126A is transmitting an optical signal in its assigned timeslot. In this case, for the next timeslot, controller 136 may determine whether laser 130 transmitted an optical signal based on the optical power level value outputted by monitor unit 134.

If laser 130 did transmit for the next timeslot, controller 136 may determine that laser 130 is transmitting at an incorrect wavelength (e.g., a wavelength that OLT 120A does not receive). However, this may lead to an incorrect diagnosis that laser 130 is transmitting at the incorrect wavelength. For instance, it may be possible that laser 130 self-corrected by the time laser 130 needed to transmit the optical signal at the next timeslot. As another case, it may be possible that there was no upstream information to transmit in the previous timeslot that led OLT 120A to indicate that no optical signal was received. Accordingly, in some examples, controller 136 may determine that network interface device 126A is a wavelength rogue network interface device based on multiple instances of OLT 120A indicating that no optical signal was received during timeslots assigned to network interface device 126A.

In some examples, network interface device 126A may determine that it is a rogue network interface device without relying on monitor unit 134, and in these examples monitor unit 134 may not be needed. For instance, controller 136 may store information for all the times controller 136 transmitted data to laser driver 132, or instructed laser driver 132 to transmit data. In these examples, if controller 136 receives information that OLT 120A did not receive data from network interface device 126A during its assigned timeslot, and controller 136 determined that controller 136 instructed laser driver 132 to transmit, controller 136 may determine that network interface device 126A is a rogue network interface device and self-quarantine network interface device 126A.

In some cases, monitor unit 134 may be able to determine the optical power level of the optical signal outputted by laser 130, but may not be able to determine the wavelength of the optical signal. Accordingly, monitor unit 134 may not be able to determine whether laser 130 is transmitting at the incorrect wavelength. However, in some examples, it may be possible for monitor unit 134 to determine whether laser 130 is transmitting at the incorrect wavelength. For instance, monitor unit 134 may be a tunable filter that receives optical signals reflected from the output of laser 130, and monitor unit 134 may be tuned to filter out optical signals whose wavelength is not the wavelength at which OLT 120A receives optical signals. In this case, if no optical signal passes through monitor unit 134, monitor unit 134 may output an optical output power level that is lower than a threshold, and controller 136 may determine that network interface device 126A is a wavelength rogue network interface device.

Figure 12:
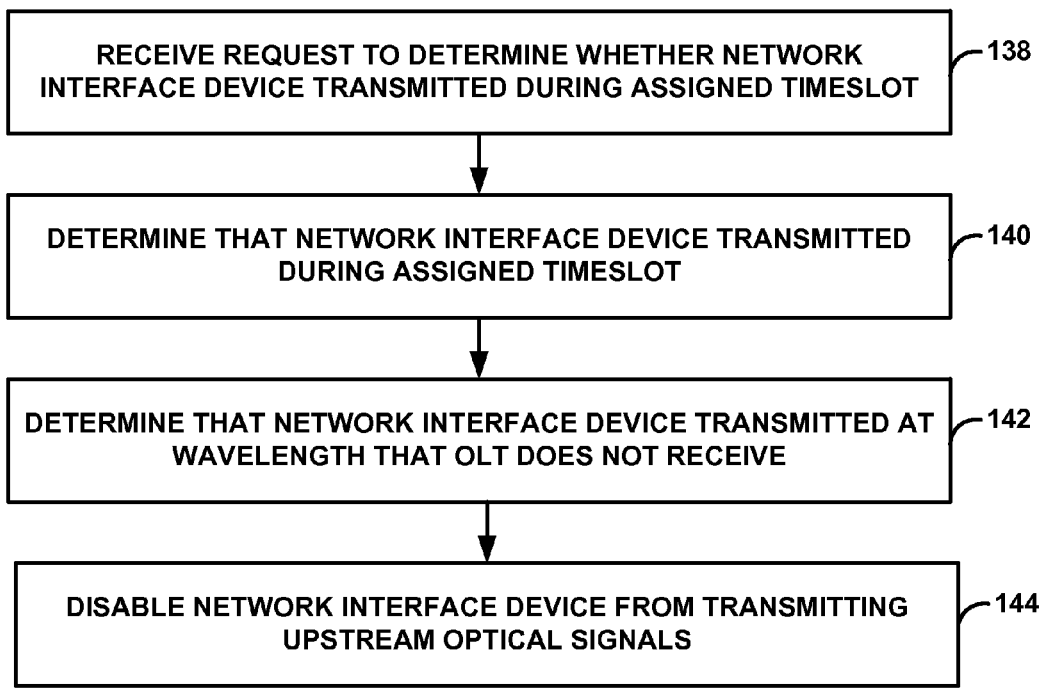
FIG. 12 is a flowchart illustrating an example method of self-quarantining.

FIG. 12 is a flowchart illustrating an example method of self-quarantining. For ease of description, FIG. 12 is described with respect to network interface device 126A and OLT 120A. As illustrated in FIG. 12, controller 136 of network interface device 126A may receive one or more requests from OLT 120A to determine whether network interface device 126A, via laser 130, transmitted one or more optical signals during one or more timeslots assigned to network interface device 126A for upstream transmission (138). Controller 136 of network interface device 126A may determine that laser 130 of network interface device 126A transmitted the one or more optical signals during one or more timeslots assigned to the network interface device for upstream transmission (140).

For example, monitor unit 134 may monitor an optical output power level of laser 130 during one or more of the timeslots assigned to network interface device 126A for upstream transmission. Controller 136 may determine that network interface device 126A transmitted the one or more optical signals during one or more timeslots assigned to network interface device 126A for upstream transmission based on the monitoring.

Furthermore, network interface device 126A may include a memory configured to store information indicating when network interface device 126A transmitted the one or more optical signals. In some examples, controller 136 may determine that network interface device 126A transmitted the one or more optical signals during the one or more timeslots assigned to network interface device 126A for upstream transmission based on the stored information. In some examples, controller 136 may determine that network interface device 126A transmitted an optical signal for a timeslot of the timeslots following the reception of the request from OLT 120A.

Controller 136 may determine that network interface device 126A is transmitting the one or more optical signals at a wavelength that OLT 120A does not receive based on the determination that network interface device 126A transmitted the one or more optical signals during one or more timeslots assigned to network interface device 126A for upstream transmission, and the reception of the one or more requests from OLT 120A (142). Controller 136 may disable network interface device 126A from transmitting upstream optical signals based on the determination that network interface device 126A is transmitting the one or more optical signals at the wavelength that OLT 120A does not receive (144).

In some examples, to confirm that network interface device 126A is a wavelength rogue network interface device, controller 136 may determine multiple instances of cases where network interface device 126A transmitted optical signals, but OLT 120A did not receive. For instance, controller 136 may receive a plurality of requests from OLT 120A. Controller 136 may also determine that network interface device 126A transmitted the one or more optical signals during a plurality of timeslots assigned to the network interface device for upstream transmission, and determine that network interface device 126A is transmitting the one or more optical signals at a wavelength that OLT 120A does not receive based on the determination that network interface device 126A transmitted the plurality of optical signals during one or more timeslots assigned to network interface device 126A for upstream transmission, and the reception of the plurality of requests from OLT 120A.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors (e.g., processor 44 or controller 32), such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "controller" as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method of rogue network interface device detection, the method comprising:
   receiving, with an optical line terminal (OLT), a data pattern in an optical signal received during a quiet timeslot, wherein the quiet timeslot comprises a timeslot that is not allocated to any of a plurality of network interface devices, with which the OLT is associated, for upstream transmission;
   determining that a rogue network interface device from which the optical signal is received during the quiet timeslot is not a network interface device to which the OLT is configured to transmit downstream data based on the received data pattern; and
   communicating with one or more other OLTs information to quarantine the rogue network interface device.

2. The method of claim 1, wherein receiving the data pattern comprises receiving the data pattern embedded with a unique identifier of the rogue network interface device, and wherein determining that the rogue network interface device from which the optical signal is received during the quiet timeslot is not the network interface device to which the OLT is configured to transmit downstream data comprises determining that the rogue network interface device from which the optical signal is received during the quiet timeslot is not the network interface device to which the OLT is configured to transmit downstream data based on the unique identifier.

3. The method of claim 2, further comprising:
  storing a list of unique identifiers for all network interface devices associated only with the OLT; and
  comparing the unique identifier embedded in the received data pattern with one or more of the unique identifiers stored in the stored list,
  wherein determining that the rogue network interface device from which the optical signal is received during the quiet timeslot is not the network interface device to which the OLT is configured to transmit downstream data comprises determining that the rogue network interface device from which the optical signal is received during the quiet timeslot is not the network interface device to which the OLT is configured to transmit downstream data based on the comparison, and
  wherein communicating with the one or more OLTs comprises communicating the unique identifier embedded in the received data pattern to the one or more OLTs.

4. The method of claim 3, wherein the OLT comprises a first OLT, and wherein the one or more of the other OLTs comprise a second OLT, the method further comprising:
  receiving, with the second OLT, the unique identifier;
  determining, with the second OLT, that the unique identifier is same as a unique identifier for a network interface device with which the second OLT is associated; and
  quarantining the network interface device associated with the second OLT.

5. The method of claim 1, wherein the OLT comprises a first OLT, and wherein the one or more of the other OLTs comprise a second OLT, the method further comprising:
  storing one or more lists of unique identifiers for all network interface devices associated with each of the OLTs and an association of the network interface devices with the one or more OLTs; and
  in response to determining that the a rogue network interface device from which the optical signal is received during the quiet timeslot is not a network interface device to which the first OLT is configured to transmit downstream data based on the received data pattern, determining that the second OLT is associated with the rogue network interface device based on the stored one or more lists,
  wherein communicating with one or more other OLTs comprises communicating to the second OLT information identifying the rogue network interface device.

6. The method of claim 5, further comprising:
  receiving, with the second OLT, information identifying the rogue network interface device; and
  quarantining, with the second OLT, the rogue network interface device.

7. The method of claim 1, wherein the data pattern comprises a first data pattern, the method further comprising:
  determining that a data transition density of the optical signal received during the quiet timeslot did not change after requesting each controller of each respective network interface device associated with the OLT to switch from the first data pattern to a second data pattern,
  wherein determining that the rogue network interface device from which the optical signal is received during the quiet timeslot is not a network interface device to which the OLT is configured to transmit downstream data comprises determining that the rogue network interface device from which the optical signal is received during the quiet timeslot is not a network interface device to which the OLT is configured to transmit downstream data based on the determination that the data transition density of the optical signal received during the quiet timeslot did not change.

8. An optical line terminal (OLT) comprising:
  a memory configured to store information; and
  one or more processors configured to:
    receive a data pattern in an optical signal received during a quiet timeslot, wherein the quiet timeslot comprises a timeslot that is not allocated to any of a plurality of network interface devices, with which the OLT is associated, for upstream transmission;
    determine that a rogue network interface device from which the optical signal is received during the quiet timeslot is not a network interface device to which the OLT is configured to transmit downstream data based on the received data pattern and the stored information; and
    communicate with one or more other OLTs information to quarantine the rogue network interface device.

9. The OLT of claim 8, wherein the one or more processors are configured to receive the data pattern embedded with a unique identifier of the rogue network interface device, and wherein the one or more processors are configured to determine that the rogue network interface device from which the optical signal is received during the quiet timeslot is not the network interface device to which the OLT is configured to transmit downstream data based on the unique identifier.

10. The OLT of claim 9,
  wherein the stored information comprises a list of unique identifiers for all network interface devices associated only with the OLT,
  wherein the one or more processors are configured to compare the unique identifier embedded in the received data pattern with one or more of the unique identifiers stored in the stored list,
  wherein to determine that the rogue network interface device from which the optical signal is received during the quiet timeslot is not the network interface device to which the OLT is configured to transmit downstream data, the one or more processors are configured to determine that the rogue network interface device from which the optical signal is received during the quiet timeslot is not the network interface device to which the OLT is configured to transmit downstream data based on the comparison, and
  wherein to communicate with the one or more OLTs, the one or more processors are configured to communicate the unique identifier embedded in the received data pattern to the one or more OLTs.

11. The OLT of claim 8,
  wherein the OLT comprises a first OLT,
  wherein the one or more of the other OLTs comprise a second OLT,
  wherein the stored information comprises one or more lists of unique identifiers for all network interface devices associated with each of the OLTs and an association of the network interface devices with the one or more OLTs,
  wherein the one or more processors are configured to determine that the second OLT is associated with the rogue network interface device based on the stored one or more lists, in response to determining that the a rogue network interface device from which the optical signal is received during the quiet timeslot is not a network interface device to which the first OLT is configured to transmit downstream data based on the received data pattern, and wherein to communicate with one or more other OLTs, the one or more processors are configured to communicate to the second OLT information identifying the rogue network interface device.

12. The OLT of claim 8, wherein the data pattern comprises a first data pattern, wherein the one or more processors are configured to determine that a data transition density of the optical signal received during the quiet timeslot did not change after requesting each controller of each respective network interface device associated with the OLT to switch from the first data pattern to a second data pattern, and wherein to determine that the rogue network interface device from which the optical signal is received during the quiet timeslot is not a network interface device to which the OLT is configured to transmit downstream data, the one or more processors are configured to determine that the rogue network interface device from which the optical signal is received during the quiet timeslot is not a network interface device to which the OLT is configured to transmit downstream data based on the determination that the data transition density of the optical signal received during the quiet timeslot did not change.

13. A system comprising:

a first optical line terminal (OLT);

a set of network interface devices associated with the first OLT; and a second OLT;

wherein the first OLT is configured to:
  receive a data pattern in an optical signal received during a quiet timeslot, wherein the quiet timeslot comprises a timeslot that is not allocated to any of the set of network interface devices, associated with the first OLT, for upstream transmission;
  determine that a rogue network interface device from which the optical signal is received during the quiet timeslot is not a network interface device of the set of network interface devices based on the received data pattern; and
  communicate with the second OLT information to quarantine the rogue network interface device.

14. The system of claim 13, further comprising:

a second set of network interface devices associated with the second OLT, wherein the first OLT is configured to store one or more a list of unique identifiers for network interface devices of the first set of network interface devices and the second set of network interface devices, wherein the first OLT is configured to determine that the rogue network interface device is not associated with the first OLT based on the stored list, and determine that the rogue network interface device is associated with the second OLT based on the stored list, wherein to communicate with the second OLT, the first OLT is configured to communicate information identifying the rogue network interface device to the second OLT, and wherein the second OLT is configured to quarantine the rogue network interface device based on the received information.

15. The system of claim 13, further comprising:

a second set of network interface devices associated with the second OLT, wherein the first OLT is configured to store a first list of unique identifiers only for network interface devices of the first set of network interface devices, wherein the second OLT is configured to store a second list of unique identifiers only for network interface devices of the second set of network interface devices, wherein the first OLT is configured to determine that the rogue network interface device is not associated with the first OLT based on the stored first list, wherein to communicate with the second OLT, the first OLT is configured to communicate information identifying the rogue network interface device to the second OLT, wherein the second OLT is configured to determine whether the rogue network interface device is associated with the second OLT based on the stored second list and the received information identifying the rogue network interface device, and wherein the second OLT is configured to quarantine the rogue network interface device based on the determination that the rogue network interface device is associated with the second OLT.

16. An optical line terminal (OLT) comprising:

means for receiving a data pattern in an optical signal received during a quiet timeslot, wherein the quiet timeslot comprises a timeslot that is not allocated to any of a plurality of network interface devices, with which the OLT is associated, for upstream transmission;

means for determining that a rogue network interface device from which the optical signal is received during the quiet timeslot is not a network interface device to which the OLT is configured to transmit downstream data based on the received data pattern; and means for communicating with one or more other OLTs information to quarantine the rogue network interface device.

17. The OLT of claim 16, wherein the means for receiving the data pattern comprises means for receiving the data pattern embedded with a unique identifier of the rogue network interface device, and wherein the means for determining that the rogue network interface device from which the optical signal is received during the quiet timeslot is not the network interface device to which the OLT is configured to transmit downstream data comprises means for determining that the rogue network interface device from which the optical signal is received during the quiet timeslot is not the network interface device to which the OLT is configured to transmit downstream data based on the unique identifier.

18. The OLT of claim 16, wherein the OLT comprises a first OLT, and wherein the one or more of the other OLTs comprise a second OLT, the OLT further comprising:

means for storing a list of unique identifiers for all network interface devices associated with each of the OLTs; and means for determining that the second OLT is associated with the rogue network interface device based on the stored list after determining that the a rogue network interface device from which the optical signal is received during the quiet timeslot is not a network interface device to which the first OLT is configured to transmit downstream data based on the received data pattern,
wherein the means for communicating with one or more other OLTs comprises means for communicating to the second OLT information identifying the rogue network interface device.

19. A computer-readable storage medium having instructions stored thereon that when executed cause one or more processors of an optical line terminal (OLT) to:
receive a data pattern in an optical signal received during a quiet timeslot, wherein the quiet timeslot comprises a timeslot that is not allocated to any of a plurality of network interface devices, with which the OLT is associated, for upstream transmission;
determine that a rogue network interface device from which the optical signal is received during the quiet timeslot is not a network interface device to which the OLT is configured to transmit downstream data based on the received data pattern; and
communicate with one or more other OLTs information to quarantine the rogue network interface device.

20. The computer-readable storage medium of claim 19, wherein the instructions that cause the one or more processors to receive the data pattern comprise instructions that cause the one or more processors to receive the data pattern embedded with a unique identifier of the rogue network interface device, and wherein the instructions that cause the one or more processors to determine that the rogue network interface device from which the optical signal is received during the quiet timeslot is not the network interface device to which the OLT is configured to transmit downstream data comprise instructions that cause the one or more processors to determine that the rogue network interface device from which the optical signal is received during the quiet timeslot is not the network interface device to which the OLT is configured to transmit downstream data based on the unique identifier.

* * * * *